(12) United States Patent
Fersman et al.

(10) Patent No.: US 9,705,975 B2
(45) Date of Patent: Jul. 11, 2017

(54) METHOD, NODES AND A COMMUNICATION DEVICE FOR HANDLING FEEDBACK INFORMATION

(71) Applicant: Telefonaktiebolaget L M Ericsson (publ), Stockholm (SE)

(72) Inventors: Elena Fersman, Stockholm (SE); Curtis Goedde, Hillsborough, NJ (US); Hongxin Liang, Upplands Väsby (SE); Joerg Niemoeller, Sundbyberg (SE); Robert Törnkvist, Karlshamn (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/893,879

(22) PCT Filed: Jan. 30, 2014

(86) PCT No.: PCT/SE2014/050120
§ 371 (c)(1),
(2) Date: Nov. 24, 2015

(87) PCT Pub. No.: WO2015/115948
PCT Pub. Date: Aug. 6, 2015

(65) Prior Publication Data
US 2016/0119411 A1    Apr. 28, 2016

(51) Int. Cl.
*G06F 15/16*    (2006.01)
*H04L 29/08*    (2006.01)
(Continued)

(52) U.S. Cl.
CPC ............... *H04L 67/10* (2013.01); *H04L 1/22* (2013.01); *H04L 12/16* (2013.01);
(Continued)

(58) Field of Classification Search
CPC .. H04L 41/0853; H04L 43/065; H04L 43/062
(Continued)

(56) References Cited

U.S. PATENT DOCUMENTS

| 2003/0005465 | A1* | 1/2003 | Connelly | H04H 60/06 |
| | | | | 725/119 |
| 2005/0143084 | A1* | 6/2005 | Cheng | H04W 8/24 |
| | | | | 455/452.2 |

(Continued)

FOREIGN PATENT DOCUMENTS

| EP | 1349347 A2 | 10/2003 |
| WO | 03078459 A2 | 9/2003 |

(Continued)

*Primary Examiner* — Duyen Doan
(74) *Attorney, Agent, or Firm* — Murphy, Bilak & Homiller, PLLC

(57) ABSTRACT

A method for and a feedback node capable of making feedback information provided from communication devices accessible to an application server, the feedback information being associated with at least one service provided by the application server, the feedback node comprising a processor and a memory comprising executable code which when executed by the processor causes the feedback node to: receive a second set of instructions from the application server, instructing the feedback node, under which conditions to provide feedback information from at least one of the communication devices to the application server; received feedback information from the at least one communication device, and forward the received feedback information to the application server according the second set of instructions.

33 Claims, 14 Drawing Sheets

(51) Int. Cl.
*H04L 1/22* (2006.01)
*H04L 12/16* (2006.01)
*H04L 12/24* (2006.01)

(52) U.S. Cl.
CPC .......... *H04L 41/0809* (2013.01); *H04L 67/28* (2013.01); *H04L 67/34* (2013.01)

(58) Field of Classification Search
USPC ................................. 709/201, 203, 223–225
See application file for complete search history.

(56) References Cited

U.S. PATENT DOCUMENTS

| | | | | |
|---|---|---|---|---|
| 2006/0069799 | A1* | 3/2006 | Hundscheidt | H04W 28/10 709/232 |
| 2008/0192710 | A1* | 8/2008 | Balachandran | H04L 47/10 370/338 |
| 2009/0112778 | A1* | 4/2009 | Beck | H04L 41/0816 706/12 |
| 2009/0227209 | A1* | 9/2009 | Craig | H04L 1/0026 455/67.13 |
| 2010/0190553 | A1* | 7/2010 | Buchholz | G07F 17/3223 463/42 |
| 2011/0029665 | A1 | 2/2011 | Wenig et al. | |
| 2012/0076058 | A1* | 3/2012 | Padmanabh | H04L 47/41 370/310 |
| 2012/0198050 | A1* | 8/2012 | Maki | H04L 43/04 709/224 |
| 2013/0052965 | A1* | 2/2013 | Meylan | H04W 52/02 455/73 |
| 2013/0166520 | A1* | 6/2013 | Vass | H04N 21/2387 707/694 |
| 2013/0326010 | A1* | 12/2013 | Singh | H04L 43/06 709/217 |

FOREIGN PATENT DOCUMENTS

| | | |
|---|---|---|
| WO | 2004040928 A1 | 5/2004 |
| WO | 2008049449 A1 | 5/2008 |

* cited by examiner

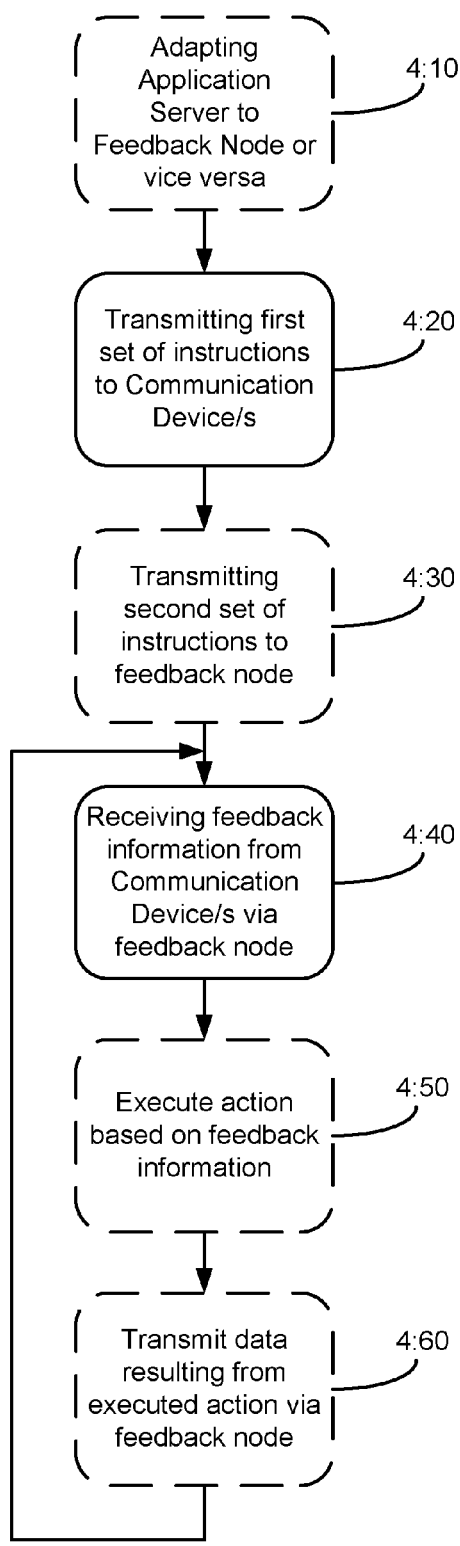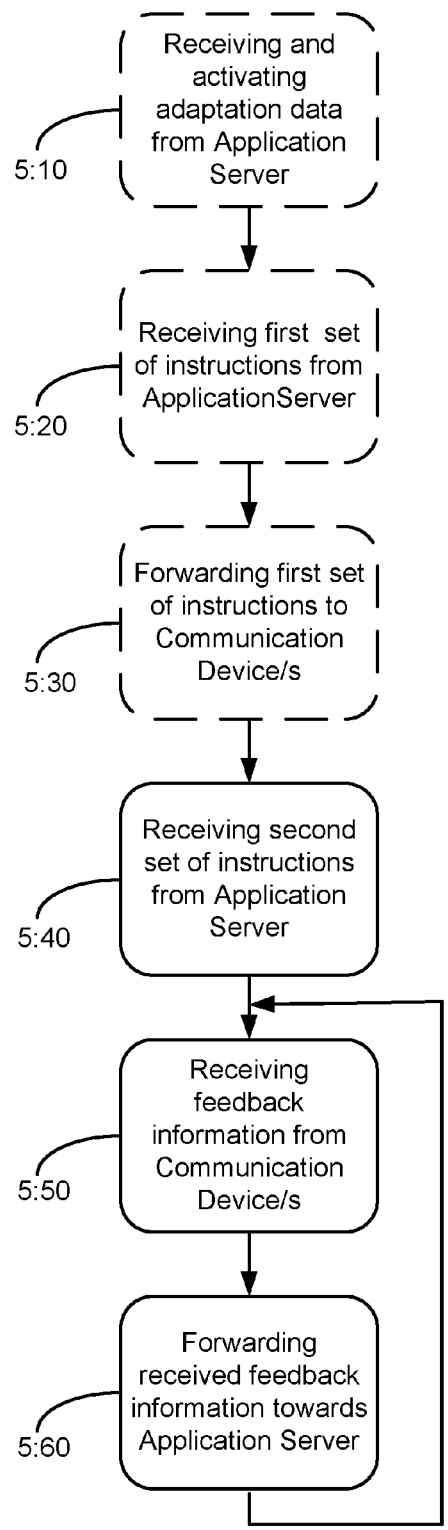
Figure 4
Figure 5a

METHOD, NODES AND A COMMUNICATION DEVICE FOR HANDLING FEEDBACK INFORMATION

TECHNICAL FIELD

The present disclosure relates to methods, as well as nodes and devices suitable for handling feedback information.

BACKGROUND

Nowadays, various types of connected communication devices, including consumer electronics and M2M devices, are connected to, and are capable of accessing various services from their respective service providers, such as e.g. YouTube, Spotify, or a TV broadcasting services distributor, through one given communication channel that is also being used for proving all types of required feedback from the devices to the service provider. FIG. 1 is a simplified illustration of several communication devices 110a . . . 110n, which are, according to common practice, all connected to a service provided by an application server (AS) 120 via one or more communication channels that are being used for transferring content to and from the communication devices, by applying two-way connection for user data, and one-way connection for providing feedback data associated with the provided service from the communication devices to the AS.

For simplicity reasons, access network nodes as well as core nodes which are also normally applied for providing the described communications are not shown in FIG. 1.

Given that there is a number of different applications within a communication device that could use the same service, such as e.g. streaming of a video from YouTube, and a number of communication devices in the network that may run these services simultaneously, the problem of requesting for, and receiving, feedback can be seen on different levels. It is normally of great importance for a service provider to receive timely feedback reports whenever something goes wrong with the service, and also to be able to ask for feedback information, such that the AS e.g. can respond by sending some information, such as e.g. configuration updates of the service to ensure the best quality of service, e.g. how to configure a communication device to ensure the best possible quality at the device.

Therefore, if something goes wrong with the available channel, for example, as a result of lack of sufficient bandwidth, or if there is some kind of failure with the channel access then there will be limited or even no possibility at all for one, some or all of the communication devices to report to the AS that something is wrong with an ongoing service delivery. Typically a communication device may experience that performance is degraded, or that the ongoing service is not delivered at all. Such a scenario can become especially severe when subscribing for media services where large amounts of content, representing feedback data, are supposed to be transmitted from a communication device to the service providers AS through the applied communication channel.

SUMMARY

It is an object of the present document to address, or at least alleviate, at least some of the problems mentioned above.

According to one aspect, a method executed in an application server for accessing feedback information from communication devices is provided, where the feedback information is associated with at least one service provided by the application server. The suggested method comprise: transmitting a first set of instructions to at least one of the communication devices, instructing the at last one communication device under which conditions to provide the feedback information from the at least one communication device to the application server via a feedback node, wherein the feedback node is a node other than the node via which user content associated with the service is provided from the application server to the at least one communication device, and receiving feedback information provided from the at least one communication device via the feedback node, according to the first set of instructions.

By applying such a method, an application server will be able to control under which conditions the feedback node is to be used for distribution of feedback information.

The first set of instructions can, according to one embodiment, be transmitted to the at least one communication device via the feedback node, while, alternatively, such instructions may instead be transmitted via one or more conventional nodes, without involving the feedback node for that task.

In order to provide for the application server to communicate with the feedback node the application server may be able to execute some initial steps. According to one embodiment it is therefore, transmitting a respective plug-in to the feedback node, for each of the at least one service, where the plug-in is a plug-in which is configured to handle protocol conversions between the respective service and the feedback node. According to an alternative embodiment, the application server is instead, adding a respective adapter layer to each of the at least one service, where the adapter layer is an adapter layer which is configured to support the protocol applied by the feedback node.

In addition to instructing communication devices under which conditions to transmit feedback information via a feedback node, the application server may also instruct the feedback node under which conditions to handle feedback information. Such a procedure comprise, according to one embodiment, transmitting a second set of instructions to the feedback node, instructing the feedback node under which conditions to provide feedback information from the at least one of the communication devices to the application server, and receiving feedback information provided from the at least one of the communication devices via the feedback node according to the second set of instructions.

Any of the first and second set of instructions may comprise aggregation instructions, instructing the application server or the at least one communication device under which conditions to aggregate and transmit feedback information provided from the at least one communication device towards the application server. By applying such aggregation instructions, the application server will be able to control the flow of feedback information even further.

In addition to controlling how to use a feedback node for transmission of feedback information, the application server may also use a feedback node for responding to a communication device, depending on feedback information provided from that device. Therefore, according to one embodiment, the application server executes an action, based on the received feedback information, and transmits data resulting from the executed action to the at least one communication device, via the feedback node. An advantage of using this feature is that, in addition to using a feedback node for transmission of feedback information, an application server will also be able to use a reliable way of communication via the feedback node also when responding to feedback information. Such a response may e.g. have the intention of trying to improve transmission conditions for a communication device, e.g. by transmitting new settings or re-configuration software, so that feedback information transmission can then commence via a conventional feedback channel.

According to another aspect, a method executed in a feedback node for making feedback information provided from communication devices accessible to an application server is provided, where the feedback information is associated with at least one service provided by the application server. The method comprise: receiving a second set of instructions from the application server, instructing the feedback node, being a node other than the node via which user content associated with the service is provided to at least one of the communication device, under which conditions to provide feedback information from at least one of the communication devices to the application server; receiving feedback information from the at least one communication device, and forwarding the received feedback information to the application server, according the second set of instructions.

In case the application server is capable of adapting the feedback node according to any of the embodiments mentioned above, the feedback node may receive and activate a plug-in provided from the application server.

According to one embodiment, the feedback node may handle a first set of instructions by first receiving the first set of instructions from the application server, instructing at least one of the communication devices under which conditions to provide feedback information from the respective communication device to the application server via the feedback node, and forwarding the first set of instructions to the at least one communication device.

After the feedback node has received a second set of instructions from an application server it can, in response to recognizing a trigger to request feedback information from at least one of the communication devices, according to the second set of instructions: transmit the triggered request for feedback information; receive feedback information in response to the request, and forward the received feedback information to the application server, according to the second set of instructions.

According to yet another aspect, a method executed in a communication device, for making feedback information provided from the communication device accessible to an application server, is provided, where the feedback information is associated with at least one service provided to the communication device by the application server. By executing such a method any communication device may be instructed by an application server under which conditions to use a feedback node for transmission of feedback information. The method comprise: receiving a first set of instructions from the application server, instructing the communication device under which conditions to provide feedback information from the communication device to the application server via the feedback node, the feedback node being a node other than the node via which user content associated with the service is provided to the communication device; acquiring feedback information associated with the at least one service; determining, based on the first set of instructions, that the recognized feedback information is to be provided to the application server via the feedback node, and providing the recognized feedback information towards the application server via the feedback node according to the first set of instructions.

According to one embodiment, the providing step mentioned above further comprises aggregating the acquired feedback information, together with additional recognized feedback information, according to aggregation instructions provided in the first set of instructions, before the feedback information is transmitted towards the application server via the feedback node.

According to one embodiment, the communication device acquires feedback information upon identifying the occurrence of a trigger event, indicated in the first set of instructions, while according to another embodiment, which may be applied alternatively or in combination with the first embodiment, the communication device acquire feedback information upon receiving a request for feedback information from the feedback node.

In case aggregation is to be applied by the communication device, the device will, according to one embodiment, aggregate all feedback information associated with a specific communication device or one or more specific applications running on that communication device, or aggregate all feedback information associated with a specific application from a specific group of communication devices, depending on the applicable instructions.

The first set of instructions may comprise instructions to provide feedback information to the application server via the feedback node, according to any of a number different conditions, such as e.g. one or more of the following conditions, applied alone or in a combination. Upon determining by the communication device that a channel other than any channel used by the feedback node for providing feedback information from the communication device to the application server is un-accessible; upon determining by the communication device that the capacity of a channel other than any channel used by the feedback node for providing feedback information from the communication device to the application server has reached below a certain threshold value; upon predicting by the communication device that the capacity of a channel other than any channel used by the feedback node for providing feedback information from the communication device to the application server is about to reach below a certain threshold value; at a specified time interval, or upon receiving a request for specific feedback information from the application server.

The second set of instructions may also comprise different types of instructions to provide feedback information to the application server, which may be applied alone or in a combination, such as e.g. at a specific time interval, or upon receiving a request for specific feedback information from the application server.

According to another aspect, an application server capable of accessing feedback information from communication devices as suggested above is suggested. According to one embodiment, an application server comprise a processor and a memory, comprising executable code, which when executed by the processor causes the application server to: transmit a first set of instructions to at least one of the communication devices, instructing the at last one communication device under which conditions to provide the feedback information from the at least one communication device to the application server via a feedback node, wherein the feedback node is a node other than the node via which user content associated with the service is provided from the application server to the at least one communication device, and receive feedback information provided from the at least one communication device via the feedback node, according to the first set of instructions.

The application server may comprise executable code which when executed by the processor causes the application server to transmit the first set of instructions to the at least one communication device via the feedback node. Alternatively such instructions may be sent via one or more conventional nodes, without involving the feedback node.

In case the application server is configured so that it can adapt the feedback node to communicate with the application server, the application server also comprises, according to one embodiment, executable code which when executed by the processor causes the application server to transmit, for each of the at least one service, a respective plug-in to the feedback node, the plug-in being configured to handle protocol conversions between the respective service and the feedback node. According to another, alternative embodiment the application server instead comprises executable code which when executed by the processor causes the application server to add, to each of the at least one service, a respective adapter layer, the adapter layer being configured to support the protocol applied by the feedback node.

In addition to providing instructions to communication devices the application server may also provide corresponding instructions to the feedback node. Therefore, according to one embodiment, the application server further comprises executable code which when executed by the processor causes the application server to: transmit a second set of instructions to the feedback node, instructing the feedback node under which conditions to provide feedback information from the at least one of the communication devices, and receive feedback information provided from the at least one of the communication devices via the feedback node, according to the second set of instructions.

Alternatively, the application server may comprise executable code which when executed by the processor causes the application server to provide at least one of the first and second set of instructions, comprising aggregation instructions instructing the at least one communication device and/or the feedback node under which conditions to aggregate and transmit feedback information provided from the communication devices towards the application server via the feedback node.

The application server may also comprise executable code, which when executed by the processor causes the application server to: execute an action based on the received feedback information, and transmit, to the at least one communication device, via the feedback node, data resulting from the executed action.

An application server according to another embodiment, which is descried with a plurality of interacting modules, comprise: a transmitting module for transmitting a first set of instructions to at least one communication device, instructing the at last one communication device under which conditions to provide the feedback information from the at least one communication device to the application server via a feedback node, wherein the feedback node is a node other than the node via which user content associated with the service is provided from the application server to the at least one communication device, and a receiving module for receiving feedback information provided from the at least one communication device via the feedback node, according to the first set of instructions.

According to yet another aspect, a first computer program is suggested which when run on a computer of the application server causes the computer to: transmit a first set of instructions to at least one of the communication devices, instructing the at last one communication device under which conditions to provide the feedback information from the at least one communication device to the application server via a feedback node, wherein the feedback node is a node other than the node via which user content associated with the service is provided from the application server to the at least one communication device, and receive feedback information provided from the at least one communication device via the feedback node according to the first set of instructions.

According to another aspect, a first computer program product is provided, which comprises computer readable code means and a computer program, such as the first computer program described above, which is stored on the computer readable code means.

According to another aspect, a feedback node capable of making feedback information provided from communication devices accessible to an application server, as suggested above, is suggested. The feedback node comprise a processor and a memory, the memory comprising executable code which when executed by the processor causes the feedback node to: receive a second set of instructions from the application server, instructing the feedback node, being a node other than the node via which user content associated with the service is provided to at least one of the communication device, under which conditions to provide feedback information from at least one of the communication devices to the application server; receive feedback information from the at least one communication device, and forward the received feedback information to the application server, according the second set of instructions.

The feedback node may also comprise executable code which when executed by the processor causes the feedback node to receive a respective plug-in, from the feedback node, for each of the at least one service, and activate each respective plug-in, where each respective plug-in is configured to handle protocol conversions between the respective service and the feedback node.

In addition, the feedback node may comprise executable code, which when executed by the processor causes the feedback node to aggregate feedback information provided from at least one of the communication devices towards the application server, according to instructions forming part of the second set of instructions.

In addition to being able to handle the second set of instructions, the feedback node may also comprise executable code which when executed by the processor causes the feedback node to: receive a first set of instructions from the application server, instructing at least one of the communication devices under which conditions to provide feedback information from the respective communication device to the application server via the feedback node, and forward the first set of instructions to the at least one communication device.

The feedback node may also be configured to actively take decisions on when to request for feedback information from one or more communication devices. Therefore, the feedback node may, according to one embodiment, further comprise executable code which when executed by the processor causes the feedback node to: recognize a trigger to transmit a request for feedback information to the at least one communication device, according to a periodicity indicated in the second set of instructions; to transmit such a request and to forward feedback information received in response to such a request, as indicated in the second set of instructions.

According to another embodiment, where the feedback node is arranged as a plurality of interacting modules, the feedback node comprise: receiving module for receiving a second set of instructions from the application server, instructing the feedback node, being a node other than the node via which user content associated with the service is provided to at least one of the communication device, under which conditions to provide feedback information from at least one of the communication devices to the application server and for receiving feedback information from the at least one communication device, and transmitting module for forwarding the received feedback information to the application server, according the second set of instructions.

According to another aspect, a second computer program for enabling a feedback node to make feedback information, provided from communication devices, accessible to an application server, is provided, where the second computer program comprises executable code means which when run on a computer of the feedback node causes the computer to: receive a second set of instructions from the application server, instructing the feedback node, being a node other than the node via which user content associated with the service is provided to at least one of the communication device, under which conditions to provide feedback information from at least one of the communication devices to the application server; receive feedback information from the at least one communication device, and forward the received feedback information to the application server, according the second set of instructions.

According to a further aspect, a second computer program product is provided, which comprises computer readable code means and a computer program, such as the second computer program suggested above, which is stored on the computer readable code means.

According to another aspect, a communication device capable of making feedback information provided from the communication device accessible to an application server is suggested, where the communication device comprise a processor and a memory, the memory comprising executable code which when executed by the processor causes the communication device to: receive a first set of instructions from the application server, instructing the communication device under which conditions to provide feedback information from the communication device to the application server via the feedback node, the feedback node being a node other than the node via which user content associated with the service is provided to the communication device; acquire feedback information associated with the at least one service; determine, based on the first set of instructions, that the recognized feedback information is to be provided to the application server via the feedback node, and transmit the recognized feedback information towards the application server via the feedback node, according to the first set of instructions.

The communication device may also, according to one embodiment, comprise executable code which when executed by the processor causes the communication device to transmit the recognized feedback information towards the application server, after having aggregated the acquired feedback information together with additional recognized feedback information, according to aggregation instructions provided in the first set of instructions, before the feedback information is transmitted towards the application server via the feedback node.

The communication device may be configured to initiate acquiring of feedback information on the basis of any of a plurality of different actions. According to one embodiment the communication device comprises executable code which when executed by the processor causes communication device to acquire feedback information upon identifying the occurrence of a trigger event, indicated in the first set of instructions, while, according to another embodiment, it may comprise executable code which when executed by the processor causes the communication device to acquire feedback information upon receiving a request for feedback information from the feedback node.

According to another embodiment, a communication device is configured as comprising a plurality of interacting modules. Such a communication device capable of making feedback information provided from the communication device accessible to an application server comprise: a receiving module for receiving a first set of instructions from the application server, instructing the communication device under which conditions to provide feedback information from the communication device to the application server via the feedback node, the feedback node being a node other than the node via which user content associated with the service is provided to the communication device; a feedback module for acquiring feedback information associated with the at least one service; a determining module for determining, based on the first set of instructions, that the recognized feedback information is to be provided to the application server via the feedback node, and a transmitting module for transmitting the recognized feedback information towards the application server via the feedback node, according to the first set of instructions.

According to another aspect, a third computer program for making feedback information provided from the communication device accessible to an application server is provided, where the third computer program comprises executable code means which when run on a computer of the feedback node causes the computer to: receive a first set of instructions from the application server, instructing the communication device under which conditions to provide feedback information from the communication device to the application server via the feedback node, the feedback node being a node other than the node via which user content associated with the service is provided to the communication device; acquire feedback information associated with the at least one service; determine, based on the first set of instructions, that the recognized feedback information is to be provided to the application server via the feedback node, and transmit the recognized feedback information towards the application server via the feedback node, according to the first set of instructions.

According to yet another aspect, a third computer program product is suggested, which comprise computer readable code means and a computer program, such as the third computer program suggested above, stored on the computer readable code means.

BRIEF DESCRIPTION OF DRAWINGS

Embodiments will now be described in more detail in relation to the accompanying drawings, in which:

FIG. 4 is a flow chart, illustrating a method for accessing feedback information from one or more communication devices via a dedicated feedback node, according to one embodiment.

FIG. 5a is a flow chart, illustrating a method executed in a feedback node, according to one embodiment for making feedback information provided from communication devices accessible to an application server via the feedback node, executable on a feedback node.

DETAILED DESCRIPTION

Briefly described, methods, as well as arrangements configured to execute the suggested methods are suggested for assuring that feedback information can be delivered from a communication device to a service provider irrespective of if the communication channel, normally used for providing feedback information to the service provider, is available or not, such that, even in situations when conventional service distribution is not operating as intended, feedback data can still be communicated from the communication device to the service provider. Thereby, the service provider may be able to improve the service performance e.g. by providing software updates which are dependent on the received feedback data.

More specifically, a node dedicated for handling feedback data, as well as feedback related data, from hereinafter referred to as a feedback node, is suggested, which when connected to one or more communication devices and an AS allows the AS to configure the feedback node and/or the different communication devices accordingly so that feedback information can be provided to the AS via the feedback node as required by the AS. As will be described in further detail below, this is achieved by providing a feedback node which allows two-way communication between the AS and the communication device in order to transmit and provide for transmission of feedback information between the mentioned entities.

As will also be described in further detail below, once the feedback node has been initiated in a feedback information distribution process, the feedback node can also be used as a means for providing appropriate data from the AS to the communication device in an attempt to eliminate or at least reduce the problems causing the need of use of the feedback node in the first place.

Figure 1:
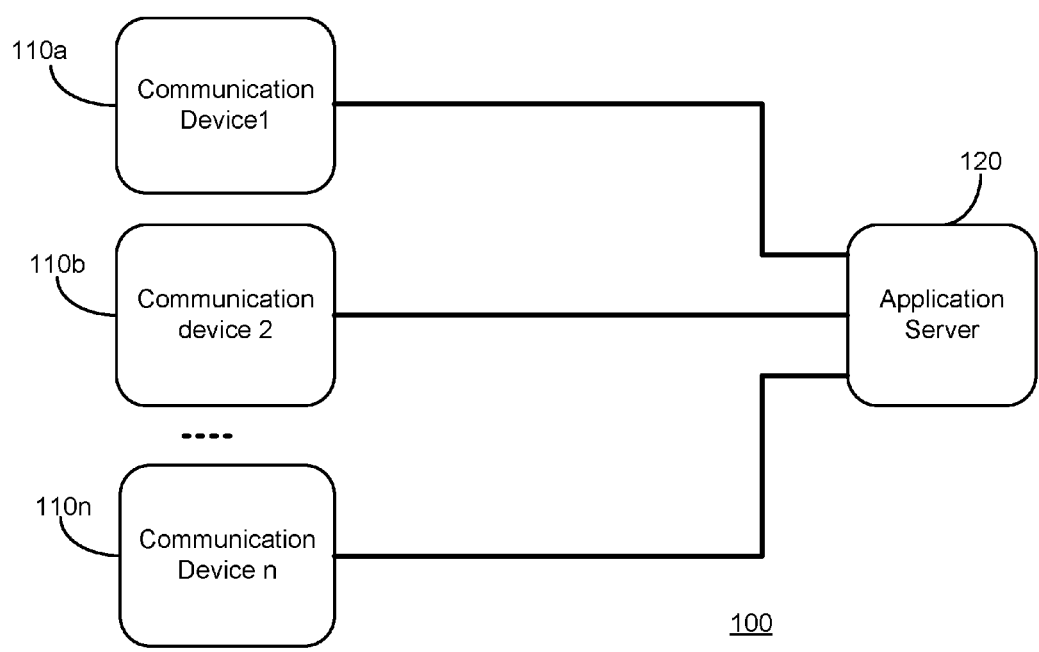
FIG. 1 is a simplified overview of a communication system according to the prior art, comprising a plurality of communication devices, each being capable of receiving services from an application server.
Figure 2:
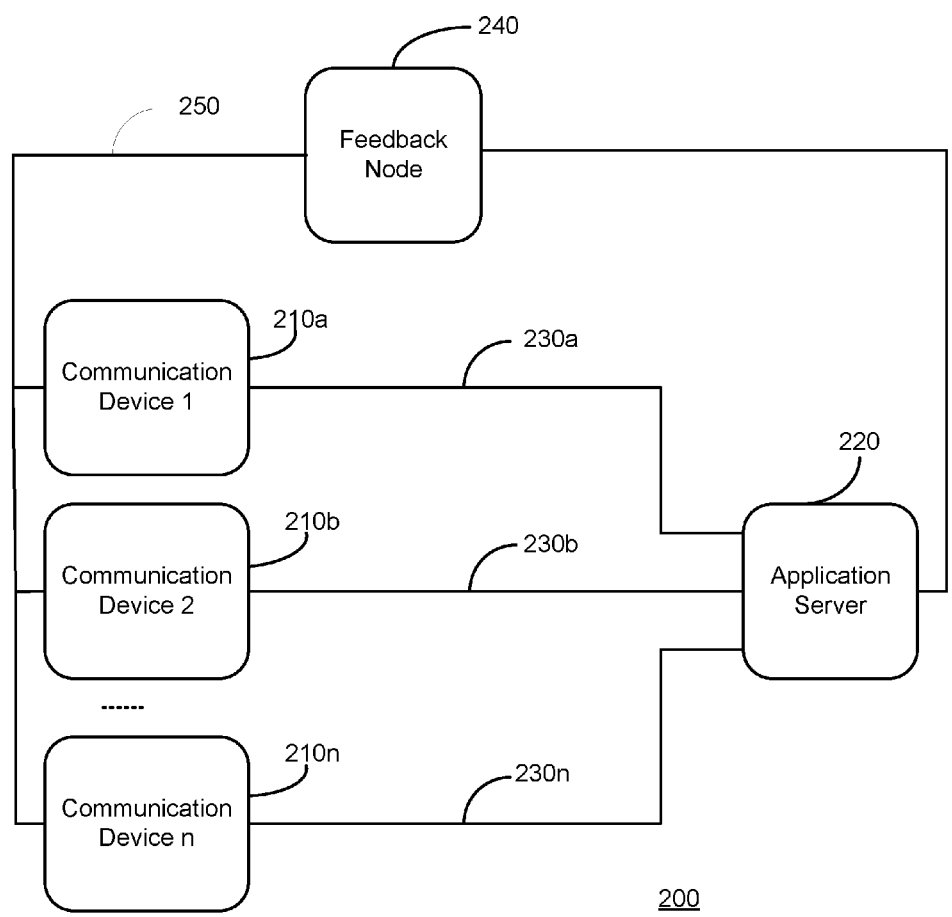
FIG. 2 is a simplified overview of a communication system, comprising a plurality of communication devices, each being capable of receiving services from an application server, and of communicating feedback data and feedback related data between the communication devices and the application server, according to one embodiment.

An updated system 200, capable of operating as suggested above is illustrated in FIG. 2, again omitting to show any access or core network nodes for simplicity reasons, where each of a plurality of communication devices, 210a ... 210n are able to communicate with an Application Server 220, not only via their respective conventional channel 230a ... 230n, but also via a feedback node 240, shared between the communication devices 210a ... 210n.

The communication devices 210a ... 210n normally have access to a respective dedicated feedback channel 230a, 230b ... 230n, which typically refer to use of shared resources, which they use only for sending feedback information associated with a service that they are using, to the AS 220 providing the service. This feedback information may be sent with a certain periodicity from the communication devices, or upon being triggered, either from the client side, i.e. at the communication device, e.g. in response to recognizing that something goes, or is about to go, wrong with the application or service, or from the server side, e.g. following an upgrade, provided from the AS to one or more communication devices. Alternatively, feedback information may be requested from a communication device by the feedback node at a certain periodicity. It is here to be understood, that periodicity may imply either a certain time interval that shall expire between each processing of feedback information by the feedback node, or a certain amount of data that shall have been processed between each processing of feedback information.

The suggested feedback node may be implemented in any type of wireless or wire-line communication network in which a node specifically dedicated for handling feedback information is required. In case of a wireless network, a channel dedicated for providing access to the network node is allocated, according to conventional application procedures, while in case of a wire-line communication network, a separate route is set up for the same purposes, again according to conventional connection set-up procedures.

The suggested, dedicated feedback channel may be used according to a number of alternative conditions, where use of the dedicated feedback channel via the feedback node may be triggered either at the server side, i.e. at the AS, or at the client side, i.e. by mechanisms residing on the communication device. Some typical scenarios will now be described with reference to the associated FIGS. 3a-3e, respectively, where it is illustrated how a communication device, on which one or more services are being executed, will be able to communicate feedback data, as well as data related to the distribution of feedback data, with a service provider, here represented by an AS, which is providing the mentioned one or more services to the UE, where the feedback information is provided to the AS via a feedback node.

It is to be understood that even though FIGS. 3a-3e only illustrate one single communication device, a typical scenario will involve a plurality of communication devices, where a process, such as the described process, is executed for each communication device that is required to use the feedback node. As will be described below, the feedback node, and its associated dedicated feedback channel, may be used either as a backup function which is configured to operate when a conventional feedback channel, for some reason is, or is expected to become, unavailable, or the feedback node and its dedicated feedback channel, for some predefined reason, is to be considered to be the preferred means of providing feedback information to the AS. In the latter case, it may e.g. have been determined that the conventional feedback channel is not fulfilling some minimum requirements for operating reliably enough.

Figure 3A:
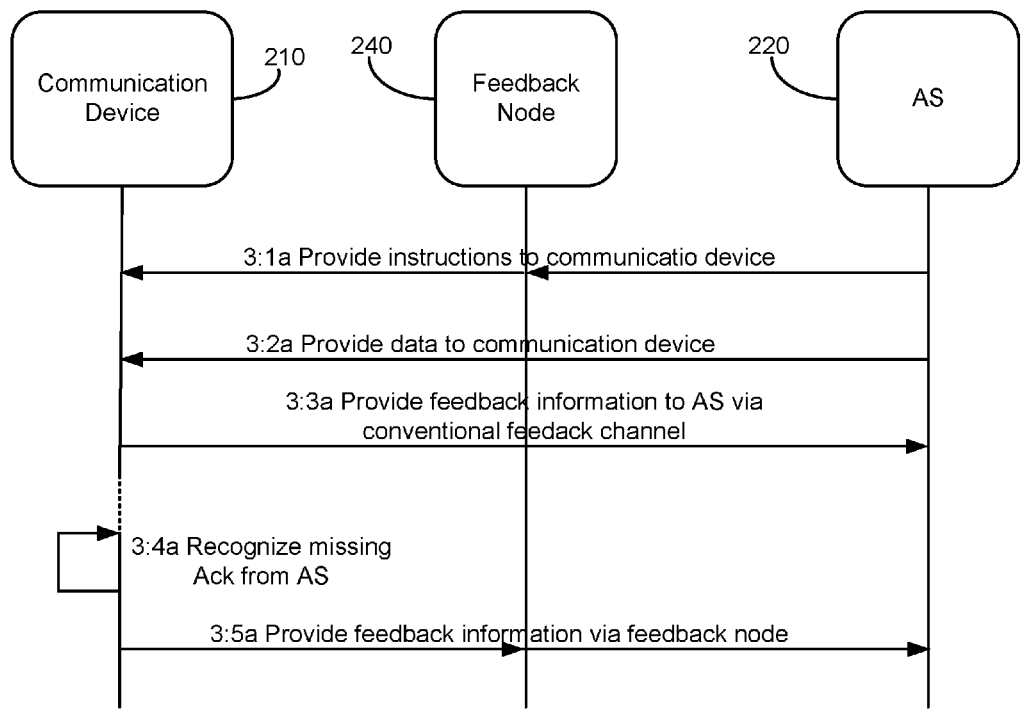
FIG. 3a-3e are signalling schemes, illustrating how distribution of feedback data via a dedicated feedback node can be triggered and executed, according to various embodiments.

FIG. 3a illustrates a communication device initiated scenario where a communication device, initially using a conventional feedback channel for transmission of feedback information, switches to provide feedback information via the feedback node when it is recognized by the communication device that the conventional feedback channel is unavailable. In the present scenario, such unavailability is recognized by recognizing that an acknowledgement of successful reception of the transmitted feedback information, which is expected from the AS to which the feedback information was sent, has not been received by the communication device.

As a prerequisite, which is relevant for all scenarios of FIG. 3a-3e, it is assumed that communication device 210 is using a service provided from AS 220.

According to a first step 3:1a, of FIG. 3a, the AS 220 provides instructions to communication device 210, instructing the communication device 210 on which conditions to provide feedback information to the AS 220 via the feedback node 240 and instructing the feedback node on how to forward feedback information from one or more communication devices to AS 220. Such instructions may e.g. comprise instructions for the communication device 210 to provide feedback information via the feedback node 240 at a certain periodicity, upon triggering a certain event by the communication device, or a combination thereof. In the present case, a missing acknowledgement from the AS 220, as suggested above, is one trigger which was included in the instructions.

As indicated with a next step 3:2a, AS 220 provide data, somehow associated with the service provided from AS 220, to communication device 210. This data may e.g. comprise configuration updates for improving the service experience.

In the present scenario, the instructions provided to communication device 210 in step 3:1a did not comprise any instructions to use the feedback node in the present situation. Therefore, communication device 210 provides feedback information relating to the provided data via a conventional feedback channel, as indicated in step 3:3a. Typically, this could be referred to as the default situation for how to handle feedback information between a communication device and an AS. For simplicity reasons, no infrastructure used for enabling communication via the conventional feedback channel is shown in the figure, but it is to be understood that any type of conventional channel and infrastructure suitable for handling transmission of feedback information known to the skilled person can be applied. However, in the present case communication device 210 expects some kind of acknowledgement (ACK) of successful reception of the data provided in step 3:2a from AS 220 in return. For some reason, due to the performance of the network, AS 220 does not manage to provide any ACK to communication device 210 via the conventional feedback channel and eventually, typically once a pre-determined time interval has expired, communication device 210 comes to the conclusion that the ACK is missing, as indicated with step 3:4a, and, thus, that communication via the conventional feedback channel is not possible, or at least not reliable enough. In the present situation we assume that the previously provided instructions indicate to communication device 210 that in such a case, communication device 210 shall provide the feedback information to the AS 220 once again, but this time via feedback node 240. This is indicated with a step 3:5a, which enables communication device 210 to successfully provide the required feedback information to AS 220. Subsequent ACKs, as well as further communication between the communication device 210 and the AS 220, can then commence via the same path. It is to be understood, that alternatively, a predefined number of re-transmissions of transmission of feedback data via the conventional channel may be executed, before the subsequent step 3:5a of FIG. 3a is executed.

Figure 3B:
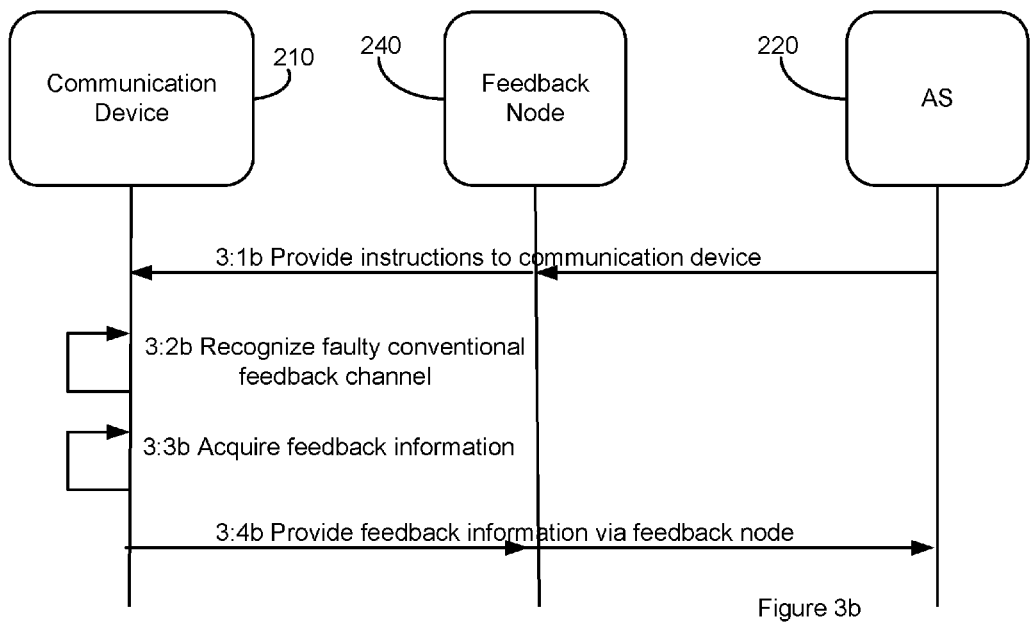

FIG. 3b illustrates another scenario where, instead of determining a failure in feedback communication by failing to communicate with an AS, communication device 210 initiates use of the feedback node 240 simply in response to recognizing a faulty conventional feedback channel, based on one or more measures taken at the communication device.

Step 3:1b is identical to step 3:1a of FIG. 3a, with the exception that the provided instructions may differ in the different scenarios. In a next step 3:2b, functionality of communication device 210 recognizes that a conventional feedback channel is faulty, or that it is not operable in a way which is reliable enough. Such a feature may rely on more or less detailed controlling functionality and thus, may be more or less qualified to trigger the occurrence of an upcoming problematic feedback channel, or may even be configured to predict that the conventional feedback channel is about, or is likely about, to become so unreliable that a switch to the feedback channel is preferred. Typically, conventional communication devices may be configured to make various measures and activate dedicated functionality based on the result of such measures. The communication device 210 may e.g. be configured to identify if the number of retransmissions increases above a certain threshold value, or that the latency of transmitted packets increases, and to act upon such a determination.

We here assume that the previously provided instructions comprise instructions on how to interpret the present situation. As indicated with a subsequent step 3:3b, communication device 210 proceeds by acquiring feedback information it is expected to provide to AS 220, either according to the instructions provided in step 3:1b, or according to procedures normally executed by the communication device 210. In a next step 3:4b communication device 210 provides the feedback information to AS 220 via feedback node 240 as instructed or expected.

Figure 3C:
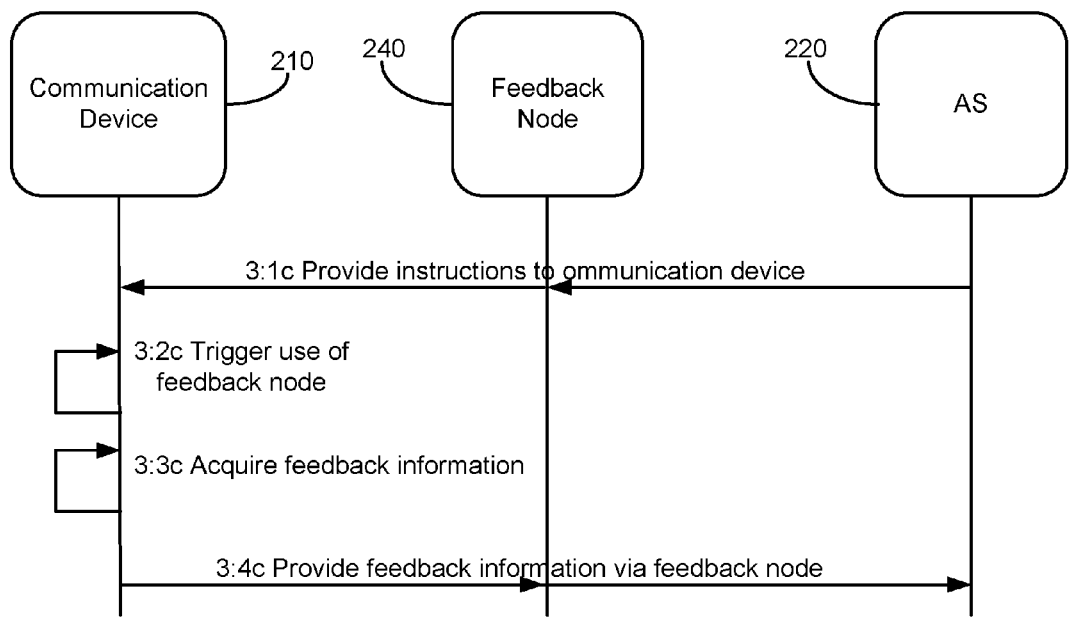

FIG. 3c illustrates yet another scenario, which to a large extent is identical to the scenario described with reference to FIG. 3b, but with the difference that the triggering of use of the feedback node 240 does not necessarily need to be initiated from the occurrence of a faulty or malfunctioning conventional feedback channel but can be triggered from practically any relevant event recognized by communication device 210 and indicated in the instruction provided in step 3:1c, as being a valid trigger for initiating use of feedback node 240 for feedback information distribution. Periodic use of the feedback node may be one way of applying such a scenario, where feedback is provided to AS 220 on a regular basis in a reliable way, irrespective of availability of the conventional feedback channel. In another scenario AS 220 may use historical data for determining when the feedback node 240 should be used by communication device 210, such that e.g. the communication device 210 is instructed to always use the feedback node 240 for transmission of feedback information during daytime. In another scenario, the communication device 210 may be instructed to always, or in combination with any other occasion, use the feedback node 240 when consuming a specific type of service, such as e.g. a HD video.

The scenario described above allows a communication device 210 to initiate use of a feedback node 240 for transmission of feedback information even though it has no communication with the AS 220 via the conventional network.

Figure 3D:
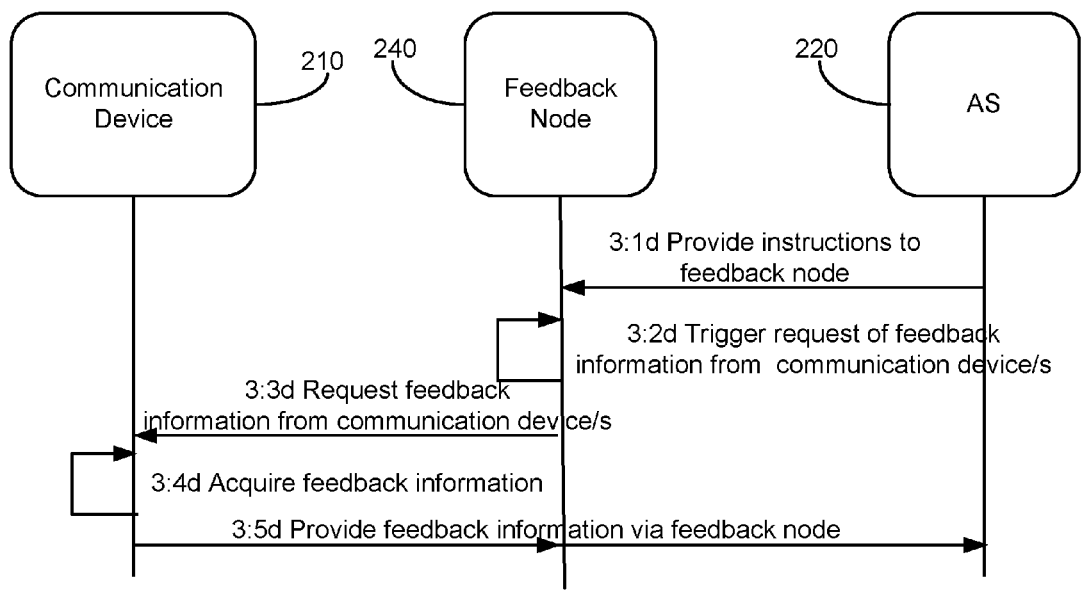

While in all the previously presented scenarios the feedback node is only used as a forwarding node of feedback information, the scenario as illustrated in FIG. 3d describes how decisions on when to acquire feedback information from one or more communication devices 210 can be taken by the feedback node. More specifically, the feedback node 240 is instructed by the AS 220 to request feedback information from communication device 210, typically at a certain periodicity, on a per service or communication device basis. According to this scenario, instructions are provided to the feedback node 240, as indicated in step 3:1d. As a pre-requisite it is assumed that instructions have already been provided from the AS 220 to communication device 210, instructing the communication device on how to handle such requests, received from the feedback node 240. In another step 3:2d a request for feedback information is triggered, according to the instruction received in step 3:1d. In a next step 3:3d, the feedback node 240 requests feedback information from communication device 210d. In response to the request, communication device 210 acquires the requested feedback information, as indicated in step 3:4d, and the feedback information is then provided towards the AS 220 via the feedback node 240 in step 3:5d.

While the previous scenarios all are triggered at the communication device 210, another scenario, illustrated in FIG. 3d, shows a situation where use of the feedback node 240 is instead triggered at the AS 220. Here instructions are provided from AS 220 to communication device 210, in correspondence with the previous scenarios. However, in this case the instructions instructs communication device 210 to provide specific required feedback information in run-time, which means that the instructions may, but need not, comprise general instructions on under which conditions to use the feedback node, but will at least comprise a request for certain feedback information from one or more services presently running on communication device 210. In response to these directed instructions, communication device 210 acquires the requested feedback information, as indicated in step 3:2d, and provides the acquired feedback information to AS 220 via feedback node 240, as indicated in following step 3:3d. Thereby, AS 220 may make use of a dedicated feedback node 240 for acquiring specific feedback information on demand.

Figure 3E:
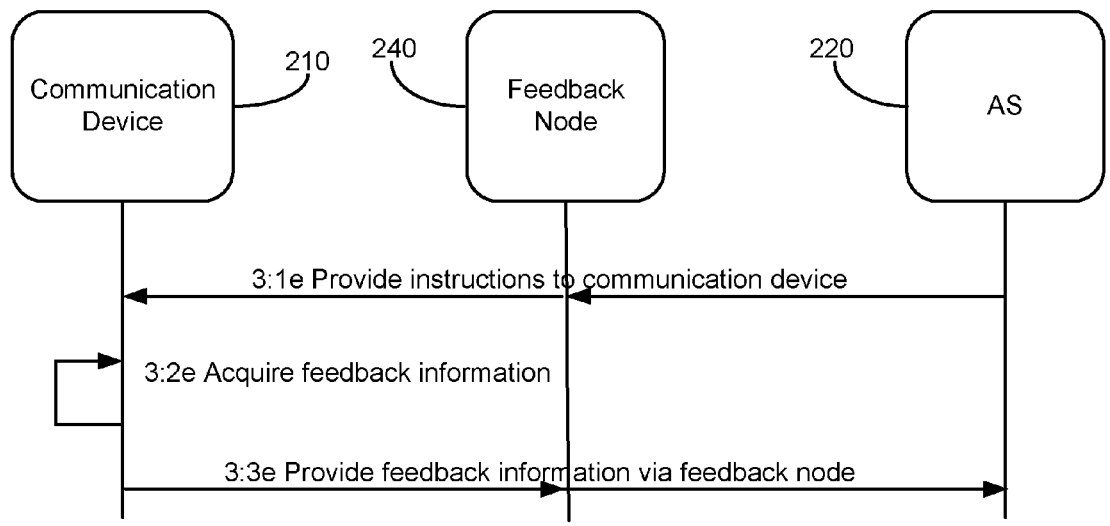

Yet another scenario is illustrated in FIG. 3e, where use of the feedback node 240 is instead triggered at the AS 220. More specifically the AS 220 is here configured to request feedback information from communication device 210, typically at a certain periodicity on a per service or communication device basis. A specific service may also be configured to trigger use of the feedback node 240 for transmission of feedback information. According to this scenario, instructions are provided to the feedback node 240, as indicated in step 3:1e. As a pre-requisite it is assumed that instructions have already been provided from the AS 220 to communication device 210, at least to the extent that the communication device 210 can interpret the request accordingly. In another step 3:2e request for feedback information is triggered, according to the instruction received in step 3:1e. In a next step 3:3e, the feedback node 240 requests feedback information from communication device 210e. In response to the request, communication device 210 acquires the requested feedback information, as indicated in step 3:4e, and the feedback information is then provided towards the AS 220 via the feedback node 240 in step 3:5e.

It is to be understood that any of the scenarios described above may be applied alone or in combination, such that e.g. the feedback node is instructed to request feedback information associated with a specific service from one or more communication devices at a pre-defined time interval, while, in between such occasions, each of these communication devices may be instructed to also provide feedback information associated with the same service upon recognising the occurrence of a certain situation.

Although not explicitly mentioned in the figures, common to all scenarios as described above with reference to any of FIG. 3a-3e, is that once the AS 220 has received feedback information via the feedback node 240, the AS 220 will be able to process this information and take any necessary action, e.g. in order to try to solve an identified communication problem, e.g. by transmitting software updates to the communication device 210, again by using feedback node 220 as a distribution node. This will be described in further detail below with reference to FIG. 4-6.

As will be described in further detail below, and which may also be applicable for all scenarios described herein, the instructions may also comprise instructions for the communication device 210 to aggregate feedback information according to certain rules, prior to providing it to the AS 220 via the feedback node 240 and the dedicated feedback channel. Alternatively, or in addition, identical or different aggregation rules may also be provided from the AS 220 to the feedback node 240, so that also the feedback node 240 is instructed to aggregate feedback data provided from one or more communication devices, before it is forwarded to the AS 220. In its simplest form the instructions to the feedback node 240 may instruct the feedback node 240 to simply, unconditionally forward all feedback information received from a communication device 210 to the AS 220. In the scenarios illustrated in FIG. 3a-3d it is assumed that no aggregation is applied. Aggregation may be arranged such that feedback information associated with a specific communication device and one or more applications or services running on that communication device, is aggregated. Alternatively, all feedback information associated with a specific application may be aggregated from a plurality of communication devices.

It is to be understood that the scenarios as described above, with reference to FIG. 3a-3e are simplified signalling schemes, showing different basic principles for how a dedicated feedback node may be used in different situations, and that further steps than the ones described and illustrated may be applied. The first step of transmitting instructions from an AS to one or more communication devices may e.g. be followed by an acknowledgement sent from the communication device to the AS via the feedback node or any conventional node/s, in order to verify successful reception of the instructions.

The instructions provided from an AS to one or more communication devices may in its simplest form comprise a specific instruction to a specific communication device, instantly requesting for specific feedback information associated with a specific service. More extensive instructions addressed to a communication device may e.g. comprise instructions to the communication device to provide feedback information when one or more specific events occur on, or are identifiable by the communication device, with a certain periodicity, or as a combination of both. Instructions may instruct a communication device to use the feedback node when it has determined that a channel normally used for transmission of feedback information is un-accessible, or that the capacity of such a channel has reached or is about to reach below a certain threshold value. The latter case may but need not indicate that the channel is estimated to be about to become un-accessible.

According to another more specific embodiment instructions may instruct a communication device to, as a default, transmit feedback information associated with a certain service via a conventional channel and node/s e.g. every minute, and, in case no acknowledgement of successful reception of the feedback information is received e.g. within 2 seconds of transmission, the communication device is instructed to use the feedback node for upcoming attempts.

As already mentioned such instructions may also comprise aggregation instructions, such as e.g. instructions to aggregate specific feedback information associated with each, or a specific group of services. Thereby one single instruction sent to a feedback node may be applicable for a number of communication devices. According to yet another embodiment, a communication device may be instructed to aggregate certain feedback information e.g. every 5 minutes, in case no feedback information trigger has been activated during the past 10 minutes.

As also already mentioned, feedback node specific instructions provided to the feedback node from the AS, may comprise instructions instructing also the feedback node to aggregate feedback information provided from one or more communication devices prior to forwarding the information to the AS. Such aggregation instructions may e.g. instruct the feedback node to aggregate feedback information associated with one specific, a group of, or all services running on a group of or all communication devices receiving at least one of the specified services from the AS.

Once a communication device has started to use the suggested feedback node, it may commence with doing so until it is made aware of that the conventional feedback channel is again operating to satisfaction or quit using the feedback node after one or more specific requested tasks have been completed, all according to the most recently received instructions from AS 220.

Figure 5C:
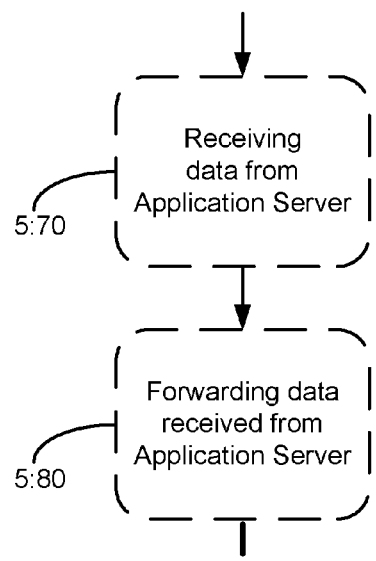
FIG. 5c is yet another flow chart, illustrating further steps of the method as according to FIG. 5a, for handling data to be forwarded to one or more communication devices.

Methods for providing for distribution of feedback information as suggested above will now be described below in association with FIGS. 4-6. As already mentioned, even though typically a plurality of communication devices are involved in the described process, FIGS. 4-6 illustrates the process to be executed between the AS and one specific communication device. Typically, a plurality of such processes is executed in parallel to address all communication devices which are of relevance. Alternatively, e.g. when providing instructions to the feedback node, one single instruction can be sent from the AS to the feedback node, which is relevant for handling feedback information distribution from a plurality of communication devices.

FIG. 4, is illustrating a method executed in an AS for accessing feedback information from communication devices via a feedback node. As already indicated, instructions need to be provided from the AS to each communication device, in order to enable the respective communication device to know how to handle different situation which may occur when a conventional feedback channel cannot be relied on. Such instructions, here referred to as a first set of instructions, are transmitted to the communication device in step 4:20. It is to be understood, that such a first set of instructions may either be provided to the communication device via the feedback node or in a conventional way via any other conventional communication node.

The feedback node and the services provided by the AS may be using different protocols, and since it will not be feasible for the feedback node to support all protocols which may be used by the different services, nor to rewrite all available services so that they conform with the protocol used by the feedback node, appropriate adaptations may be required.

As indicated with an optional step 4:10, which is typically to be executed before the AS is sending any instructions via the feedback node, the AS may, according to a first embodiment, initially adapt itself to the feedback node, e.g. by adding to each service provided by the AS an adapter layer which is configured to support the protocol applied by the feedback node. As a consequence, the adapter layer will be running as a part of the respective service, thereby enabling the feedback node to route each message destined to the AS to the correct destination, i.e. service, at the AS, without later having to care about anything in terms of the applied protocol.

According to a second embodiment, each service, or a specific function adapted to operate on behalf of one or more services, and executed on the AS, may be configured to implement a respective plug-in, capable of handling the appropriate protocol conversion, on the feedback node. Thereby each service itself will be working in normal manners and no change whatsoever will be required to the respective service. In the present scenario the feedback node will be able to take care of the required plug-in lifecycle management according to commonly known procedures, once the first plug-in has been installed.

As already mentioned above, in addition to providing instructions to one or more communication devices, instructions may also be provided to the feedback node, in case an aggregation function is required to be executed there. This is indicated with optional step 4:30, where such instructions are referred to as a second set of instructions. It is to be understood that even though it appears from the figure as if the first and second set of instructions are sent at separate occasions as separate messages, this may, but do not necessarily need to be the case. Alternatively such instructions may be sent to the feedback node in one single message but possibly with different instructions applicable for different communication devices.

In a subsequent step 4:40, which may occur any time after the second set and/or the first set of instructions have been sent from the AS to the feedback node, the AS receives feedback information, provided via the feedback node, according to the applicable instructions. As indicated in FIG. 4, step 4:40 may be repeated, each time an event indicated in the relevant instructions appear at the feedback node and/or the communication device, until any new instructions are provided from the AS. In the latter scenario, the process as described in FIG. 4 is terminated and a new one is initiated, starting at step 4:20 or 4:30.

After one or more occasions of receiving feedback information from a communication device, according to step 4:40, the AS may, depending on the present circumstances, respond by determining a specific action based on the acquired feedback information, as indicated with optional step 4:50, and, as a consequence, as indicated with optional, subsequent step 4:60, transmit data to the communication device, where the data is the result of the action executed in step 4:50. Such data may e.g. comprise configuration update software for the communication device, which will be able to eliminate or at least diminish the problems causing the need for use of the feedback node. Such data may alternatively comprise providing additional instructions to a communication device, instructing it to reattempt to use a specific service at a later occasion, since present problems cannot presently be solved.

FIG. 5a is illustrating another method which is to be executed on a feedback node, for making feedback information provided from communication devices assessable to an AS, as suggested herein. As indicated with step 5:40, the AS need to receive instructions, instructing it under which conditions to handle feedback information provided from one or more communication devices and destined for the AS. As indicated with an optional step 5:10, and as mentioned earlier, the feedback node may initially need to be adapted by the services of the AS to enable the AS and feedback node to communicate with each other. As indicated in this optional step, the feedback node receives and activates appropriate adaptation data, such as e.g. one or more plug-ins. According to other optional steps 5:20 and 5:30, the feedback node may receive a first set of instructions, valid for one or more communication devices, from the AS, and forward those instructions to the respective communication device. Alternatively, such instructions may be provided to one or more communication devices via a conventional feedback channel or any other channel available for communication of data from the AS to the one or more communication devices.

Once a first set of instructions has been provided to at least one communication device and a second set of instructions has been provided to the feedback node, the feedback node will be capable of receiving feedback information, as indicated with step 5:50, and to forward the received feedback information to the AS, either instantly, or according to valid aggregation instructions, as indicated with step 5:60. The steps of receiving and forwarding feedback information may be repeated, as indicated in the fig., until new instructions are provided to the feedback node, after which the ongoing process is terminated and a new one is started, starting from step 5:40 and/or 5:20. As already mentioned above, even though the first and second set of instructions is indicated as separate messages, these instructions may alternatively be sent as one single message.

Figure 5B:
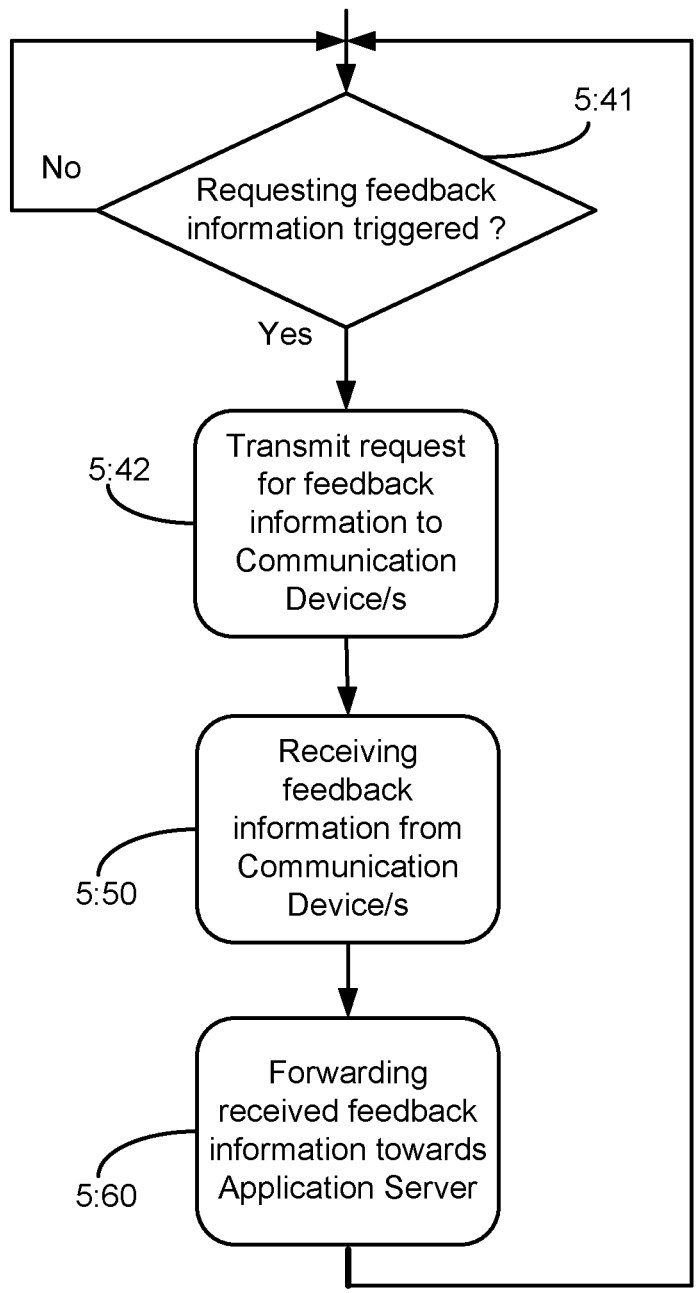
FIG. 5b is another flow chart, illustrating further steps executable in the method as executed according to FIG. 5a, where, according to one embodiment, decisions on when to request for feedback information is taken by the feedback node.
Figure 6:
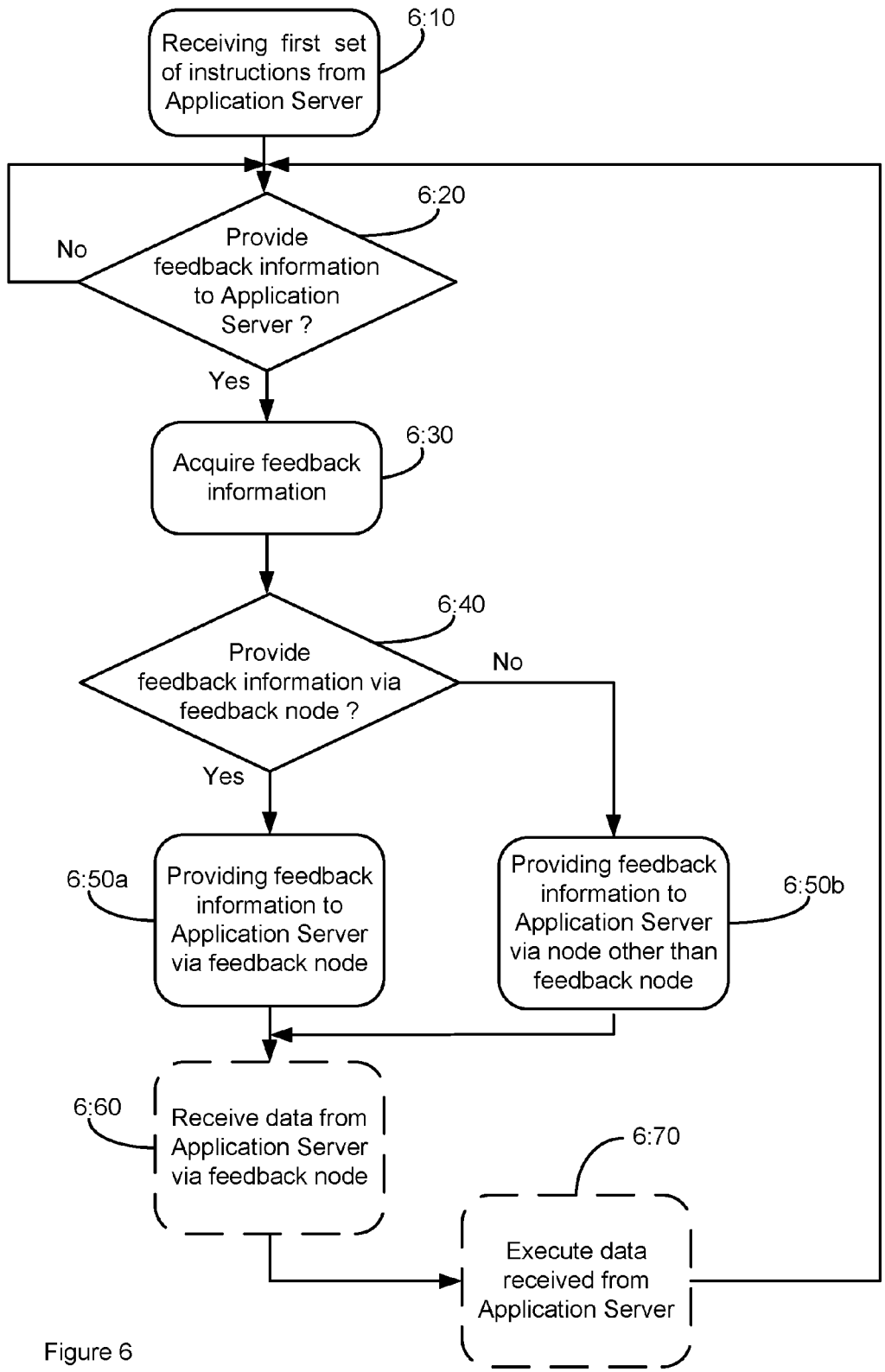
FIG. 6 is yet another flow chart, illustrating a method executable at a communication device, for making feedback information available to an application server via a feedback node, according to one embodiment.

FIG. 5b illustrates a process which will be run in parallel to the one executed with reference to FIG. 5a in case the feedback node has been instructed to initiate requests of feedback information on a periodic basis. More specifically, subsequent to step 5:40 according to FIG. 5a, a periodicity related process starts in parallel to receiving and forwarding feedback information triggered at the communication device, as indicated with step 5:41. Once it is time to request feedback information, such a request is sent to the communication device, as indicated with step 5:42, and the requested feedback information is received, as indicated in step 5:50, either instantly, or after aggregation by the communication device, if applicable, and forwarded, again, either instantly or after aggregation, this time by the feedback node, as indicated in step 5:60. This process is typically repeated, such that after step 5:60, the process is initiated once again from step 5:41, until new instructions are provided to the feedback node, e.g. instructing it to apply another periodicity or to terminate with these periodic requests.

FIG. 5c illustrates an optional process which may follow step 5:60 of FIG. 5a, which will be executed in case AS responds to feedback information, as suggested in steps 4:50 and 4:60 in FIG. 4. More specifically, as indicated with a first step 5:70, the feedback node receive data originating from an action which has been based on provided feedback information from the AS, and, according to a subsequent step 5:80, the feedback node forwards the received data to the communication device, accordingly. Following these steps the process as described with reference to FIG. 5a-5c may be terminated, due to sufficient performance of a conventional feedback channel, or the process may commence from step 5:50.

Again, even though the methods as described with reference to FIGS. 4, 5a, 5b and 5c, all describe a respective process directed to one single communication device, each of these processes may be directed to handle a plurality of communication devices, wherein one single instruction may be applicable for a plurality of communication devices, e.g. in case identical instructions are to be applied for the different communication devices, or a plurality of parallel processes may be executed in parallel, such that separate instructions can be processed for each, or for different sub-groups of communication devices.

FIG. 6 is illustrating a method executed on a communication device for making feedback information from the communication device assessable to an AS.

As indicated in a first step 6:10 of FIG. 6, the communication device is initially receiving a first set of instructions from the AS, instructing it under which conditions to use the feedback node for feedback information distribution to the AS. Once the communication device has received the instructions it is capable of applying them accordingly and, thus, once it recognizes that feedback information should be provided to the AS, according to such relevant instructions, as indicated with the "Yes" branch of step 6:20, it acquires the required feedback information, as indicated with a subsequent step 6:30. That feedback information should be provided to the AS may either be determined due to that one or more actions indicated in the relevant instructions have been trigger at the communication device, or due to that a request for feedback information has been received, either from the AS via the feedback node, or from the feedback node, in the latter case due to a periodic request initiated at the feedback node. As already indicated above, the determining that feedback information is to be sent via a feedback channel, as executed in step 6:20, may be based on determining that a specific action has occurred at the communication device, that an expected acknowledgement is missing, or that instructions received by the communication device indicate this.

As indicated with another step 6:40, it is then determined whether the feedback information shall be sent to the AS via a conventional feedback channel, i.e. by using a default procedure for providing feedback information, as indicated with step 6:50b, or whether any event indicated in the instructions has been triggered, such that the feedback information shall instead be sent via the feedback node, as indicated with alternative step 6:50a. Optionally, the providing of feedback information to the AS may result in actions taken at the AS in order to try to solve, or at least minimize, the problems causing the feedback distribution problem, and consequently, the communication device may in a subsequent step receive data provided from the AS via the feedback node, as indicated in optional step 6:60, after which the communication device process the received data accordingly, as indicated in another subsequent optional step 6:70. Following this step, the process of FIG. 6 may be repeated from step 6:20, as indicated in the figure, or the process may be terminated and replaced by a conventional feedback procedure, in case the action initiated by the AS was successful.

The described procedure may be repeated, starting again from step 6:20, as long as the instructions remain unchanged. Once new instructions are provided, the existing process is terminated and a new process is started at step 6:10.

It is also to be understood, that each of the methods as described with reference to FIG. 4-6 is focusing on how to use a feedback node as described herein, but that also additional steps may be executed at the respective node or device. In case the scenario described above with reference to FIG. 3a is executed, the methods as describe above will also comprise steps for transmitting and receiving feedback information via conventional nodes, where in such a case, the feedback information is handled and transmitted in a conventional way.

Figure 7:
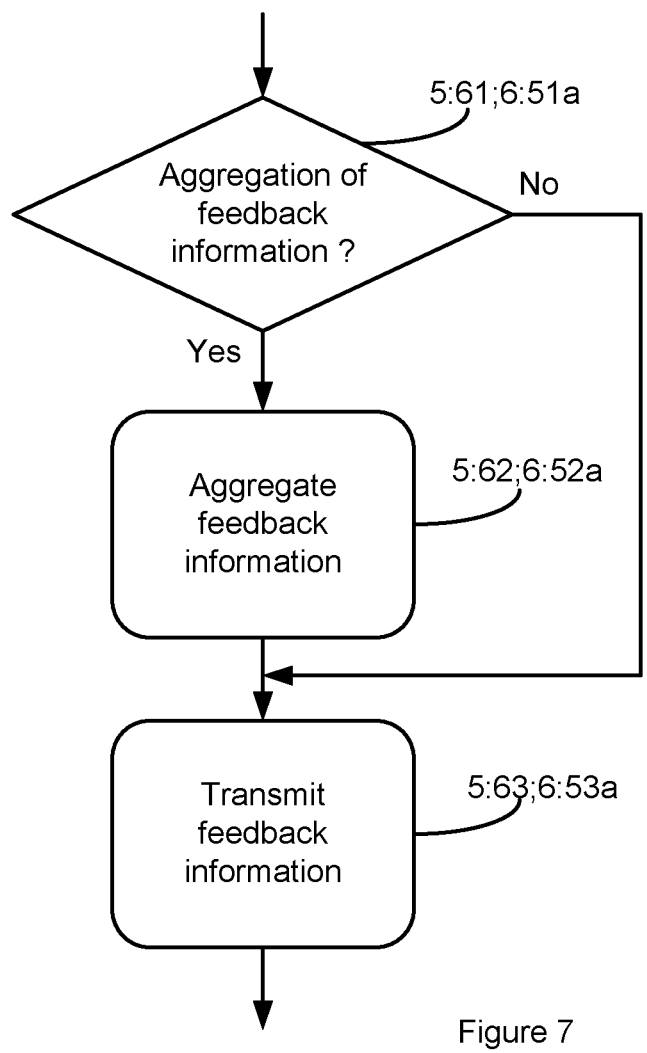
FIG. 7 is another flow chart, illustrating optional steps of executing aggregation of feedback information at a communication device and/or at a feedback node, in a method executed according to FIG. 5a or 6, according to one embodiment.

FIG. 7 illustrate execution of step 5:60 and step 6:50a, i.e. providing of feedback information to an AS from a feedback node or a communication device, respectively, in further detail. More specifically, in case aggregation is to be applied at the feedback node, according to a second set of instructions, step 5:62 is executed prior to step 5:63, while in case the communication device is to apply aggregation, according to a first set of instructions, step 6:52a is executed prior to step 6:53a, respectively. In case no aggregation is to be applied, only step 5:63 or 6:53a, respectively, is instead executed.

In order to be able to execute any of the methods described above, the involved AS, and communication device both need to be adapted therefore. For that reason, an AS, a communication device and a feedback node capable of handling feedback information as suggested herein will now be described in further detail below. Even though a typical AS, communication device and feedback node, respectively, may comprise additional hardware and/or software, only hardware and software which is relevant for achieving the technical solutions as suggested herein has been presented in the following figures, and will be described in further detail below, while other possible hardware and software, which is not necessary for understanding the solutions as described herein has been omitted for simplicity reasons.

An AS according to a first embodiment which is configured to execute the method described above with reference to FIG. 4 will now be described in further detail with reference to FIG. 8.

Figure 8:
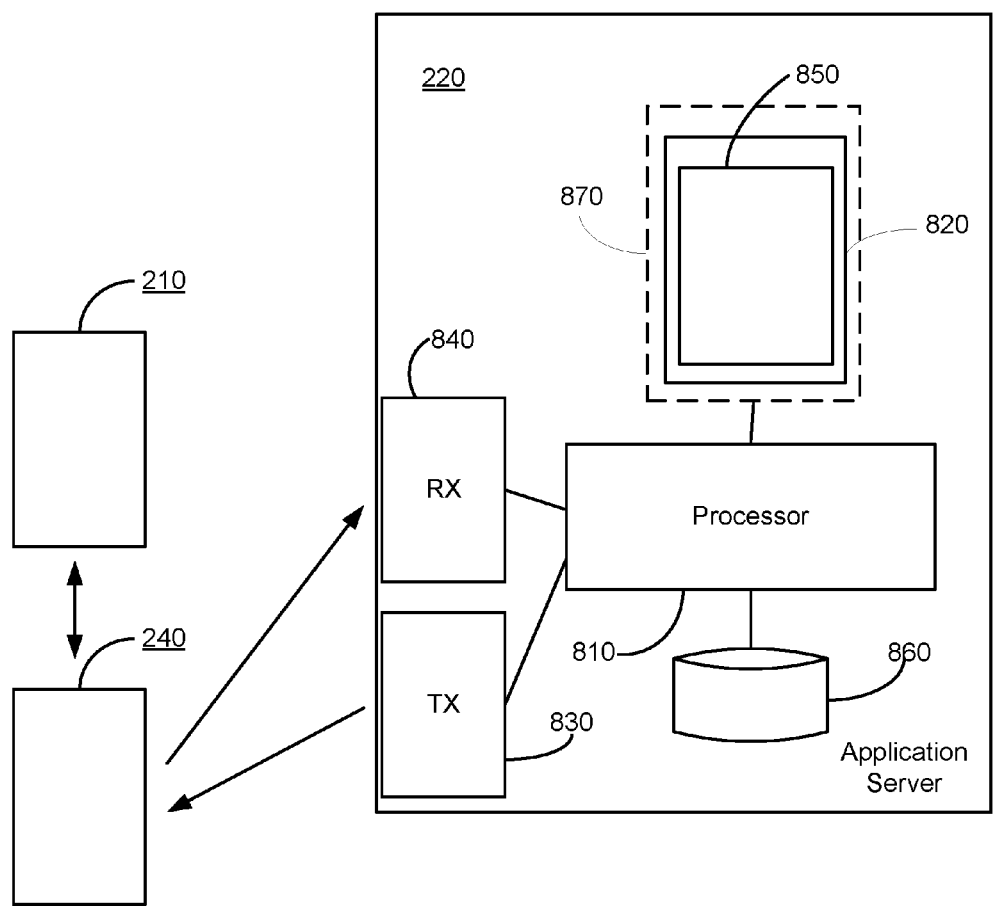
FIG. 8 is a block scheme, illustrating an application server, capable of executing the method according to FIG. 4, according to one embodiment.

The AS 220 of FIG. 8 is a software implemented AS comprising a processor 810 and a memory 820, where the memory 820 comprise executable code or instructions which when executed by the processor 810 causes the AS 220 to perform the method as executed according to FIG. 4. The AS 220, also comprises one or more memories, here represented by memory 860 for storing e.g. pre-defined instructions, received feedback information as well as other relevant data. The AS 220 also comprises a transmitting unit (TX) 830, which is configured to transmit data content to a feedback node 240. In addition, the AS 220 comprises a receiving unit (RX) 840, which is configured to receive data content from the feedback node 240.

More specifically, the AS 220 of FIG. 8 comprise executable code which when executed by the processor 810 causes the AS 220 to transmit instructions, which can be referred to as a first set of instructions, to at least one communication device 210, which is accessing an application or service from the AS 240, instructing the at last one communication device 210 under which conditions to provide the feedback information from the at least one communication device 210 to the AS 220 via the feedback node 240, and to receive feedback information provided from the at least one communication device 210 via the feedback node 240, according to the first set of instructions. As has already been explained above, these instructions may be based on any of a number of alternative conditions, such that a dynamic use of the feedback node can be obtained.

Executable code causes the AS 220 to transmit the first set of instructions to the at least one communication device 210 via the feedback node 240, according to some conditions, while according to other conditions, these instructions can instead be transmitted to one or more communication devices 210 via any conventional communication channel, i.e. without involving the feedback node 240.

The AS 220 and the feedback node 240 may initially be pre-configured to communicate with each other. If this is not the case, or if updates are required, the AS 220 may be configured to adapt the feedback node 240 to the AS 220.

According to one embodiment, executable code causes the AS 220 to transmit, for each service for which the AS 800 shall be able to communicate via at least one communication device a respective plug-in, to the feedback node via the feedback node, where each plug-in is configured to handle required protocol conversions between the respective service and the feedback node 240. This method is to be preferred in case the AS should not need to consider about adaption lifetime.

According to another embodiment, which is to be preferred in case one wants to avoid use of plug-ins, or in case the AS is kept completely unaware of feedback node operation, executable code instead causes the AS 220 to add, to each relevant service, a respective adapter layer, such that the adapter layer is being configured to support the protocol applied by the feedback node 240.

The feedback node 240 may be pre-configured on how to handle feedback information received from communication devices, e.g. if the feedback node 240 is only acting as a forwarding node of feedback information, distributed from one or more communication devices 210 to the AS 220. Alternatively, the feedback node 240 may be configurable by, or from, the AS 220, thereby introducing more flexibility into the way the feedback node 240 is to be able to handle feedback information. According to one embodiment, executable code causes the AS 220 to transmit instructions, which may be referred to as a second set of instructions, to the feedback node 240, instructing the feedback node 240 under which conditions to provide feedback information from the at least one of the communication devices 210, and receive feedback information provided from the at least one of the communication devices 210 via the feedback node 240, according to the second set of instructions.

Both, or any, of the communication devices 210 and the feedback node 240 may be configured to aggregate feedback information. Therefore any of the first or second set of instructions may comprise aggregation instructions, instructing the feedback node 240, or one or more communication devices 210, under which conditions to aggregate feedback information provided from the respective device or node, before it is transmitted towards the AS 220 when transmitting feedback information via the feedback node 240.

The AS 220 may also be able to respond to feedback information received via the feedback node 240 by providing certain data to a respective communication device, aiming at improving the present conditions at the communication device 210. More specifically, according to an optional embodiment, executable code causes the AS 220 to trigger execution of an action based on the received feedback information, resulting from the executed action to the at least one communication device, via the feedback node. The mentioned action may e.g. comprise processing the received feedback information, with or without additional network and/or communication device related data, in order to come up with a preferred software update option, wherein data constituting the obtained software update is transmitted to the communication device via the feedback node.

If applicable, executable code may also cause the AS 220 to handle reception of feedback information via a conventional channel and node/s accordingly, including transmitting an acknowledgement to a communication device 210 in case of successful reception.

The executable code mentioned above together constitutes a computer program which when run on a computer, forming part of the AS 220, or emulating an AS 220, causes the computer to execute the respective executions. In this sense, the processor 810 can be seen as forming part of such a computer.

According to yet another embodiment, the suggested computer program may be arranged as a computer program product 870, comprising computer readable code means and the computer program 850, which is stored on the computer readable code means.

Alternatively, an AS 220 may be described as comprising a plurality of interacting modules, which, according to one embodiment, are implemented as a computer program running on a processor, i.e. as software related modules managed by a processor (not shown), and which are configured to realise the method as described above with reference to FIG. 4. According to other embodiments, the modules, as well as other commonly used functionality, such as e.g. one or more receivers and transmitters which are capable of operating in association with the respective modules, may be implemented as hardware modules or units, or as a combination of hardware and software.

Figure 9:
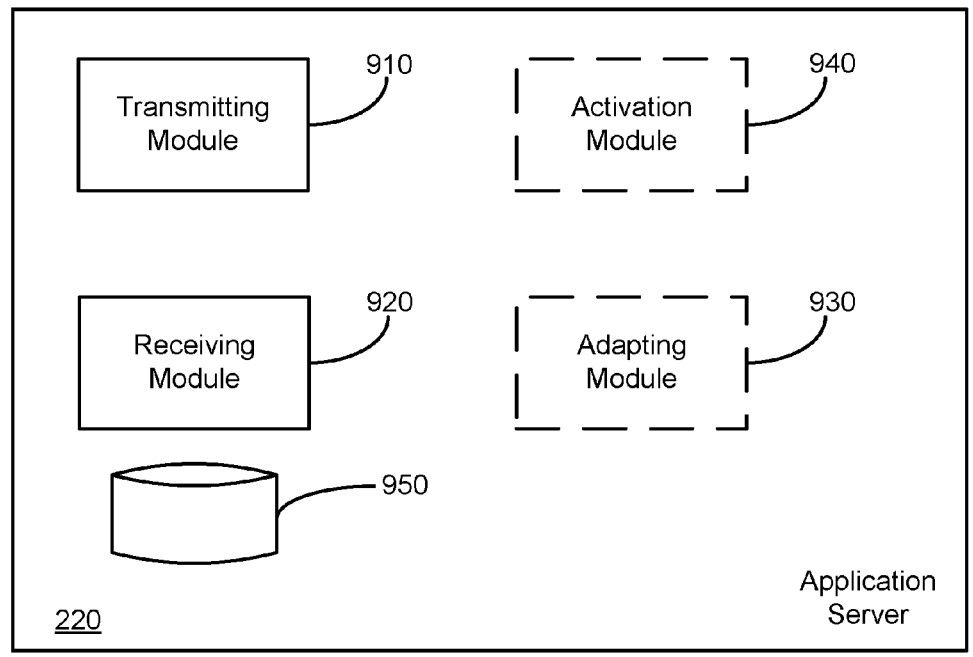
FIG. 9 is another block scheme, illustrating an application server capable of executing the method according to FIG. 4, according to another embodiment.

More specifically FIG. 9 shows one possible configuration, where an AS 220 comprises a transmitting module 910, which is configured to transmit instructions to communication devices, corresponding to step 4:20 in FIG. 4 and possibly also to a feedback node, corresponding to step 4:30 in FIG. 4. This module may also be configured to transmit data to a communication device via a feedback node, corresponding to step 4:60 of FIG. 4. A receiving module 920 is configured to receive feedback information from communication devices, corresponding to step 4:40 of FIG. 4. Optionally, an adapting unit 930 is configured to adapt a feedback node to the AS, according to any of the embodiments described with reference to step 4:10 of FIG. 4. Furthermore, optionally, an activation module 940 is configured to execute a predefined action based on received feedback information, i.e. received feedback information is processed, possibly in combination with additional, retrieved data, in order to retrieve data that can be provided to the communication device from which feedback information was received earlier, corresponding to step 4:50 of FIG. 4. In the latter case, the transmitting module 910, or another, dedicated transmitting module, is configured to transmit the retrieved data to the respective communication device, via the feedback node, corresponding to step 4:60 of FIG. 4. The AS 220 also comprises a memory 950 which corresponds to memory 860 in FIG. 8.

A feedback node, according to a first embodiment, which is configured to execute the method previously described with reference to FIG. 4, will now be described in further detail with reference to FIG. 10.

Figure 10:
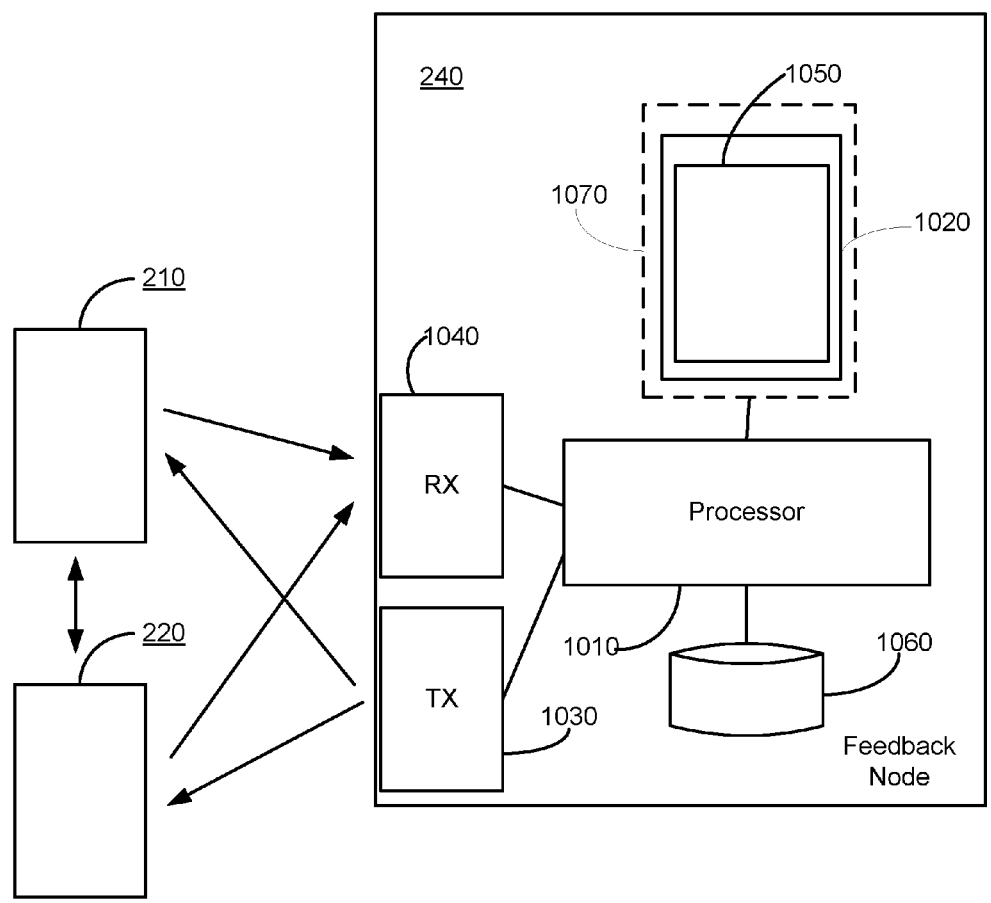
FIG. 10 is yet another block scheme, illustrating a feedback node capable of executing the method according to FIG. 5a, according to one embodiment.

The feedback node 240 of FIG. 10 is a software implemented feedback node comprising a processor 1010 and a memory 1020, where the memory 1020 comprise executable code or instructions which when executed by the processor 1010 causes the feedback node to perform the method as executed according to FIG. 5. The feedback node 240, also comprises a memory 1060 for storing e.g. pre-defined instructions. The feedback node 240 also comprises a transmitting unit (TX) 1030, which is configured to transmit data content to one or more communication devices 210 or an AS 220. In addition, the feedback node 240 comprises a receiving unit (RX) 1040, which is configured to receive data content from a communication device 210 or an AS 220.

More specifically, the feedback node 240 comprise executable code which when executed by the processor 1010 causes the feedback node 240 to receive instructions, here referred to as a second set of instructions from the application server, instructing the feedback node under which conditions to provide feedback information from at least one of the communication devices 210 to the AS 220, to receive feedback information from the at least one communication device 210, and to forward the received feedback information to the AS 220, according the second set of instructions.

According to one embodiment, which is applicable in case the AS 220 is capable of adapting the feedback node 240, executable code causes the feedback node 240 to receive, from the AS 220, for each of the at least one service, a respective plug-in, where the plug-in is configured to handle protocol conversions between the respective service of the AS 220 and the feedback node 240.

Instructions, instructing a communication device 210 under which conditions to use the feedback node 240, may be transmitted from the AS 220 to the communication device 210 via the feedback node 240, and, therefore, according to one embodiment, executable code causes the feedback node 240 to receive instructions, here referred to as a first set of instructions, from the AS 220, instructing at least one of the communication devices 210 under which conditions to provide feedback information from the respective communication device 210 to the AS 220 via the feedback node 240, and to forward the first set of instructions to the at least one communication device 1200. Such instructions may e.g. comprise instructions to request for certain feedback information, according to a certain periodicity.

Optionally, the feedback node 240 may be capable of requesting feedback information from one or more communication devices 210, based on instructions relevant for the feedback node, and, if this is the case, executable code will cause the feedback node 240 to recognize such a trigger according to instructions, to transmit such a request, to receive feedback information in response to such a request, and to forward such information, again according to instructions relevant for the feedback node.

As another possible option, the feedback node 240 may also be capable of aggregating feedback information and in such a case, according to one embodiment, executable code causes the feedback node 240 to aggregate feedback information provided from at least one of the communication devices 210 towards the AS 220, according to further instructions of the second set of instructions.

The executable code mentioned above together constitutes a computer program 1050 which when run on a computer (not shown) forming part of the AS 220, or emulating an AS 220, causes the computer to execute the respective mentioned executions. In this sense, the processor 1010 can be seen as forming part of such a computer, where the computer forms part of a feedback node, or a node comprising corresponding functionality.

According to yet another embodiment, the suggested computer program may be arranged as a computer program product 1070, comprising computer readable code means and the computer program 1050, which is stored on the computer readable code means.

Alternatively, according to another alternative embodiment, a feedback node 240 may be described as comprising a plurality interacting modules, which are implemented as a computer program running on a processor (not shown), i.e. as software related modules which are managed by the processor, and which are configured to realise the method as previously described with reference to FIG. 5. According to other embodiments, the modules, as well as other commonly used functionality, such as e.g. one or more receivers and transmitters which are capable of operating in association with the respective modules, may be implemented as hardware modules or units, or as a combination of hardware and software.

Figure 11:
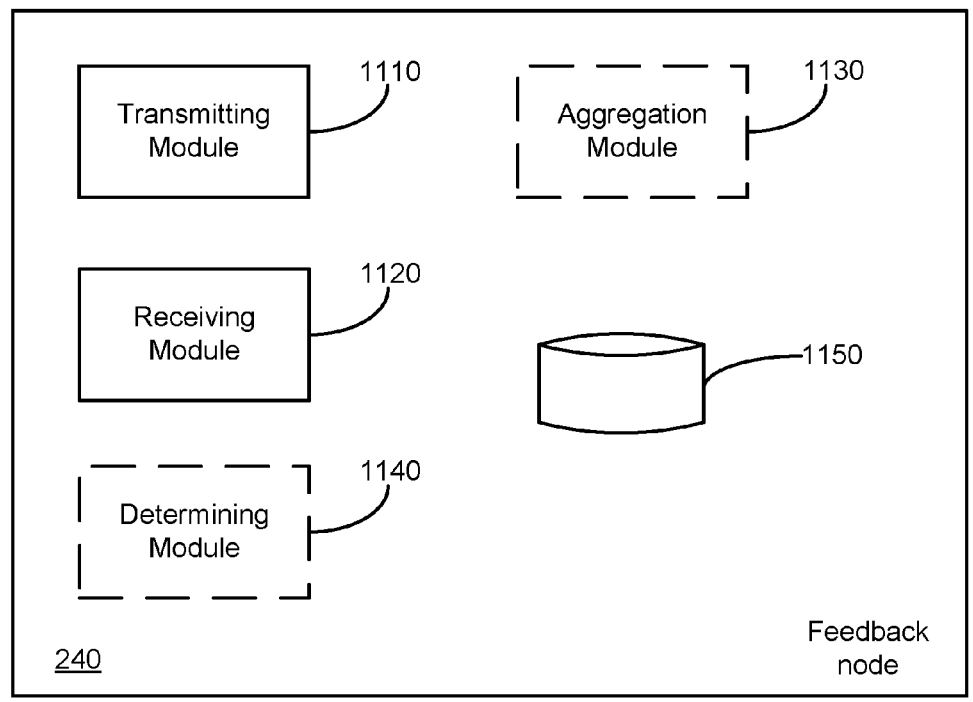
FIG. 11 is another block scheme, illustrating a feedback node capable of executing the method according to FIG. 5a, according to another embodiment.

More specifically FIG. 11 shows one possible configuration, where a feedback node 240 comprises a receiving module 1120, configured to receive instructions from an AS 220, corresponding to step 5:40 of FIG. 5*a*, and receiving feedback information from a communication device 210, corresponding to step 5:50, and possibly also step 5:20 of FIG. 5*a*. The receiving module 1120 may also be configured to receive adaptation data for adapting the feedback node 240 to the AS 220, corresponding to step 5:10 of FIG. 5*a*. The feedback node 240 also comprises a transmitting module 1110 for forwarding feedback information towards the AS 220, corresponding to step 5:60 of FIG. 5*a* and, optionally, also for transmitting instructions to a communication device 210, corresponding of step 5:30 of FIG. 5*a*. Furthermore, the feedback node 240 may also comprise an aggregation module 1130, configured to aggregate received feedback information before it is forwarded to the AS 220, based on instructions provided via the receiving module 1120, or a separate receiving module. In addition, the feedback node 240 may comprise a determining module 1140 for determining when to request feedback information from one or more communication devices 210. Typically such a module comprises timer functionality for enabling requesting at certain time intervals. As indicated in FIG. 11, the feedback node also comprises a memory 1150, corresponding to memory 1060 of FIG. 10.

A communication device capable of communicating with an AS 220 via a feedback node 240, which, according to a first embodiment, is configured to execute the method previously described with reference to FIG. 6, will now be described in further detail with reference to FIG. 12. The communication device 210 as described herein may be any device intended for accessing services via an access network and configured to communicate over the access network. For instance, the communication device may be, but is not limited to: mobile phone, smart phone, sensor device, meter, vehicle, household appliance, medical appliance, media player, camera, or any type of consumer electronic, for instance, but not limited to, television, radio, lighting arrangement, tablet computer, laptop, or PC. The communication device may be a portable, pocket-storable, hand-held, computer-comprised, or vehicle-mounted mobile device, enabled to communicate voice and/or data, via a wireless or wire-line connection.

Figure 12:
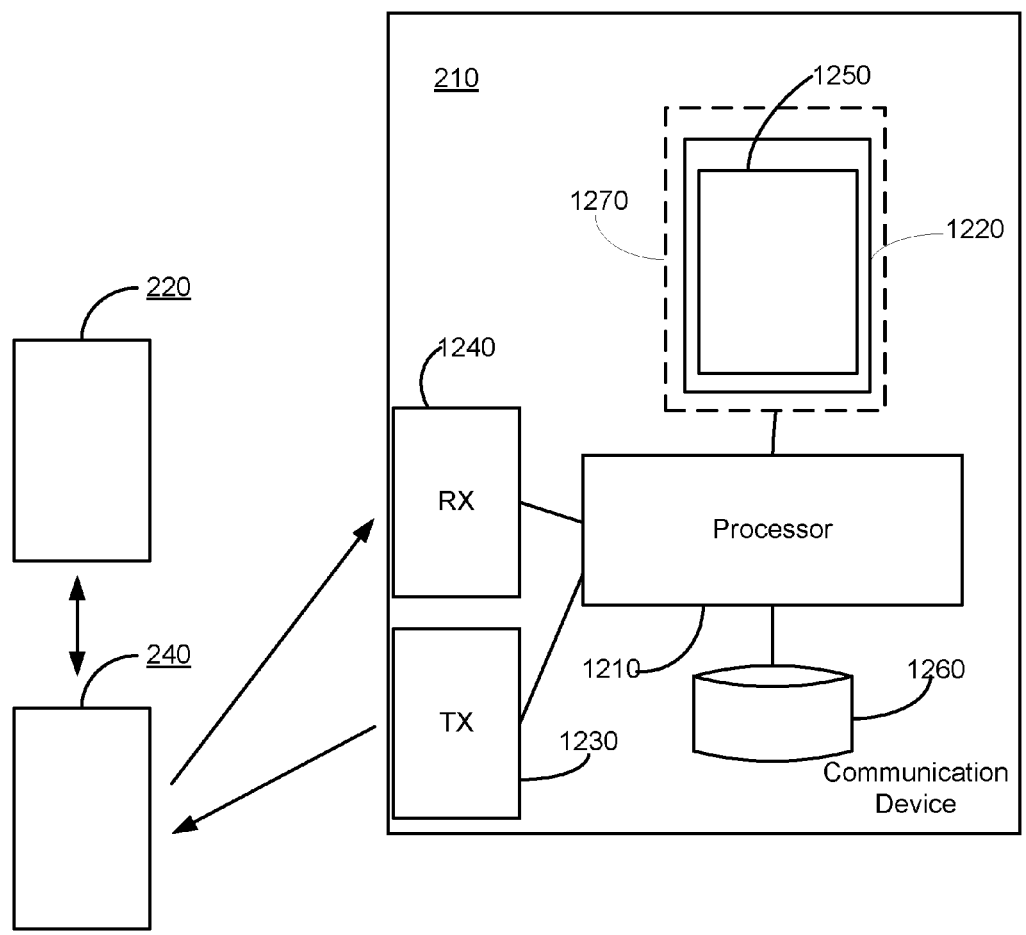
FIG. 12 is a block scheme, illustrating a communication device capable of executing the method according to FIG. 6, according to one embodiment.
Figure 13:
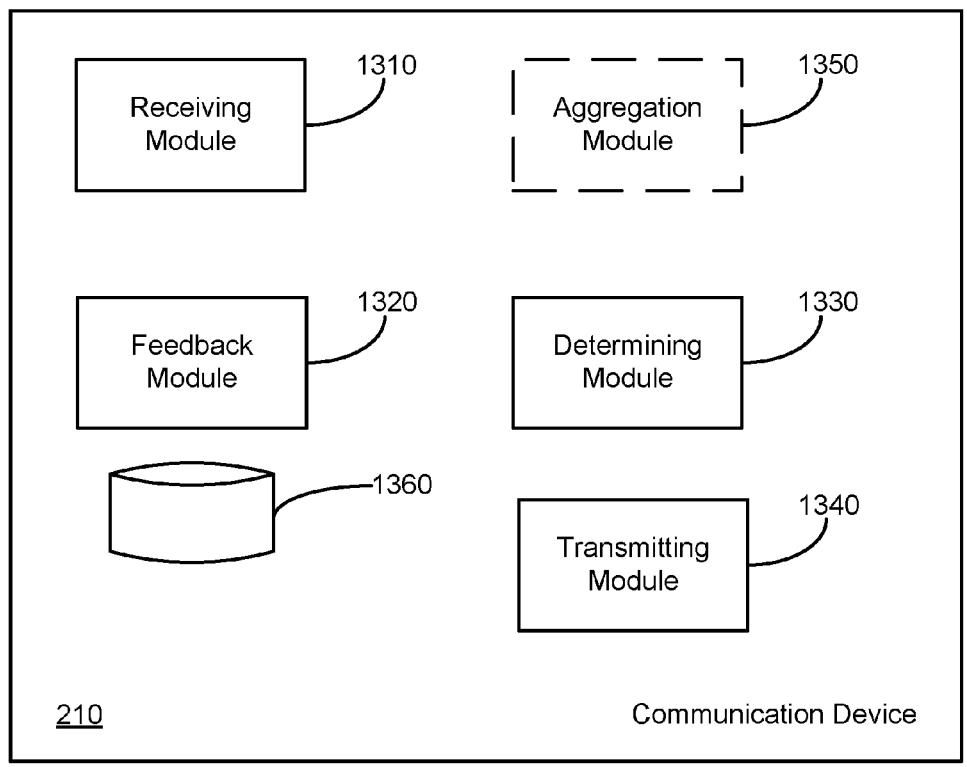
FIG. 13 is another block scheme, illustrating a communication device capable of executing the method according to FIG. 6, according to another embodiment.

The communication device 210 of FIG. 12 is a software implemented communication device 210, comprising a processor 1210 and a memory 1220, where the memory 1220 comprise executable code or instructions which when executed by the processor 1210 causes the communication device 210 to perform the method as executed as previously described with reference to FIG. 6. The communication device 210, also comprises a memory 1260 for storing e.g. pre-defined instructions, aggregated feedback information, as well as other data. The communication device 210 also comprises a transmitting unit (TX) 1230, which is configured to transmit feedback information to the AS 220 via the feedback node 240. In addition, the communication device 210 comprises a receiving unit (RX) 1240, which is configured to receive instructions, and possibly also other data provided from the AS 220 as suggested herein.

More specifically, the communication device 210 comprise executable code which when executed by the processor 1210 causes the communication device 210 to: receive instructions, here referred to as a first set of instructions, from the AS 220, instructing the communication device 210 under which conditions to provide feedback information from the communication device to the AS 220 via the feedback node 240; to acquire feedback information associated with the at least one service; to determine, based on the first set of instructions, whether or not the recognized feedback information is to be provided to the AS 220, via the feedback node, and to transmit the recognized feedback information towards the application server via the feedback node if this is indicated in the first set of instructions. Alternatively, the communication device is configured to provide the feedback information to the AS 800 according to conventional procedures, not requiring any feedback node.

The communication device 210 may be capable of aggregating feedback information. For such a purpose, executable code is, according to one embodiment, capable of causing the communication device 210 to transmit the recognized feedback information towards the AS 220 after having aggregated the acquired feedback information together with additional recognized feedback information, according to aggregation instructions provided in the first set of instructions, before the feedback information is transmitted towards the AS 220 via the feedback node 240. The aggregation may e.g. comprise aggregating feedback data retrieved according to certain triggering conditions from all applications or services running on the communication device 210 and provided from AS 220, or only a subset of such services.

The communication device 210 may be configured to acquire feedback information, which is later transmitted to the AS 220 via the feedback node 240 upon identifying the occurrence of a trigger event indicated in the first set of instructions, or upon receiving a request for feedback information from the AS 220 and the feedback node 240, or as a combination of both.

The executable code mentioned above together constitutes a computer program 1250 which when run on a computer (not shown) form part of the communication device 210, or emulates a communication device, thereby causing the computer to execute the respective described executions. In this sense, the processor 1210 can be seen as forming part of such a computer.

According to yet another embodiment, the suggested computer program may be arranged as a computer program product 1270, comprising computer readable code means and the computer program 1250, which is stored on the computer readable code means.

Alternatively, a communication device 210 may be described as comprising a plurality of interacting modules, which, according to one embodiment, are implemented as a computer program running on a processor (not shown), i.e. as software related modules which are managed by a processor, and which are configured to realise the method as previously described with reference to FIG. 6. According to other embodiments, the modules, as well as other commonly used functionality, such as e.g. one or more receivers and transmitters, which are capable of operating in association with the respective modules, may be implemented as hardware modules or units, or as a combination of hardware and software.

More specifically FIG. 12 shows one possible configuration, where a communication device 210 comprises: a receiving module 1310 for receiving instructions from the AS 220, corresponding to step 6:10 of FIG. 6, and optionally also for receiving data from AS 220 via a feedback node 240 corresponding to step 6:60 of FIG. 6, a feedback module 1320 for acquire feedback information, corresponding to step 6:30 of FIG. 6, a determining module 1330 for determining, based on the first set of instructions, whether or not the recognized feedback information is to be provided to the application server via the feedback node, corresponding to step 6:40 of FIG. 6. The determining module 1330 may also be configured to make certain determinations as to whether or not certain conditions according to relevant instructions have occurred, and thus if transmission of feedback information is triggered. The communication device 210 also comprises a transmitting module 1340 for transmitting the recognized feedback information towards the AS 800 via the feedback node, if this is required according to the first set of instructions, corresponding to step 6:50*a* of FIG. 6, or via a conventional network node, if this is not the case, corresponding to step 6:50*b* of FIG. 6.

In case the communication device 210 is to be capable of aggregating feedback information, it also comprises an aggregation module 1350, configured to aggregate feedback information according to instructions. The communication device 210 also comprises a memory 1360, corresponding to memory 1260 of FIG. 12.

The processors, the transmitters and the receivers described above with reference to FIGS. 8, 10 and 12 may be arranged as logical units, separate physical units or a combination of both logical and physical units.

The processors described in FIGS. 8, 10 and 12 may be arranged as a Central Processing Unit (CPU), which may be a single unit or a plurality of units. Furthermore, the suggested computer program products may be arranged in the form of a non-volatile memory, e.g. a flash memory, a disc drive, a Random-access memory (RAM), Read-Only Memory (ROM) or an Electrically Erasable Programmable Read-Only Memory (EEPROM)). The memories mentioned herein can be any combination of read and write memory (RAM) and read only memory (ROM). The suggested processors may include general purpose microprocessors, instruction set processors and/or related chips sets and/or special purpose microprocessors such as Application Specific Integrated Circuit (ASICs). Each or some of the processors may also comprise board memory for caching purposes.

It is to be understood that the choice of interacting modules, as well as the naming of the nodes within this disclosure are only for exemplifying purpose, and nodes suitable to execute any of the methods described above may be configured in a plurality of alternative ways in order to be able to execute the suggested procedure actions.

To perform the actions described above in the conjunction with figures mentioned above, at least one of the code means may in alternative embodiments be implemented at least partly as hardware circuits.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method executed in an application server for accessing feedback information from communication devices, the feedback information being associated with at least one service provided by the application server, the method comprising:
    transmitting a first set of instructions to at least one of the communication devices, said first set of instructions instructing the at least one communication device under which conditions the at least one communication device is to use a feedback node for sending feedback information to the application server, and
    receiving feedback information from the feedback node, as provided to the feedback node from the at least one communication device, according to the first set of instructions.

2. The method according to claim 1, wherein transmitting the first set of instructions to the at least one communication device comprises transmitting the first set of instructions via the feedback node.

3. The method according to claim 1, comprising an initial step of:
    transmitting, for each of the at least one service, to the feedback node, a respective plug-in, the plug-in being configured to handle protocol conversions between the respective service and the feedback node.

4. The method according to claim 1, comprising an initial step of:
    adding, to each of the at least one service, a respective adapter layer, the adapter layer being configured to support a protocol applied by the feedback node.

5. The method according to claim 1, comprising the further step of:
    transmitting a second set of instructions to the feedback node, instructing the feedback node under which conditions the feedback node is to provide the application server with the feedback information sent to the feedback node from the at least one communication device, and
    receiving the feedback information from the feedback node, according to the second set of instructions.

6. The method according to claim 5, wherein at least one of the first and second set of instructions comprise aggregation instructions instructing the feedback node or the at least one communication device under which conditions to aggregate and transmit the feedback information.

7. The method according to claim 1, comprising the further steps of:
executing an action, based on the feedback information as received by the application server, and
transmitting data resulting from the executed action to the at least one communication device, via the feedback node.

8. A method executed in a feedback node for making feedback information provided from communication devices accessible to an application server, the feedback information being associated with at least one service provided for the communication devices by the application server, the method comprising:
receiving a second set of instructions from the application server, said second set of instructions instructing the feedback node under which conditions to provide the feedback information to the application server;
receiving the feedback information from the at least one communication device, and
forwarding the feedback information to the application server, according to the second set of instructions.

9. The method according to claim 8, comprising the further steps of:
receiving a first set of instructions from the application server, said first set of instructions instructing at least one of the communication devices under which conditions the at least one communication device is to use the feedback node to provide feedback information to the application server, and
forwarding the first set of instructions to the at least one communication device.

10. The method according to claim 8, further comprising, following the reception of the second set of instructions:
recognizing a trigger to request feedback information from the at least one communication device, according to the second set of instructions,
transmitting the triggered request for feedback information to the at least one communication device,
receiving feedback information from the at least one communication device in response to the request,
and forwarding the received feedback information to the application server, according to the second set of instructions.

11. A method executed in a communication device for making feedback information provided from the communication device accessible to an application server, the feedback information being associated with at least one service provided by the application server to the communication device, the method comprising:
receiving a first set of instructions from the application server, said first set of instructions instructing the communication device under which conditions the communication device is to use a feedback node to provide feedback information from the communication device to the application server;
acquiring feedback information associated with the at least one service,
determining, based on the first set of instructions, that the feedback information is to be provided to the application server via the feedback node, and, in response, providing the feedback information to the feedback node.

12. The method according to claim 11, wherein the providing step comprises aggregating the acquired feedback information together with additional feedback information according to aggregation instructions provided in the first set of instructions, before transmitting the feedback information towards the application server via the feedback node.

13. The method according to claim 12, wherein the aggregation instructions comprise instructions to aggregate feedback information according to at least one of:
aggregating all feedback information associated with a specific communication device and one or more specific applications running on that communication device, and
aggregating all feedback information associated with a specific application from a specific group of communication devices.

14. The method according to claim 11, comprising the further step of acquiring the feedback information upon identifying the occurrence of a trigger event indicated in the first set of instructions.

15. The method according to claim 11, comprising the further step of acquiring the feedback information upon receiving a request for feedback information from the feedback node.

16. The method according to claim 11, wherein the first set of instructions comprise instructions to use the feedback node for providing feedback information to the application server according to at least one of:
upon determining by the communication device that a channel other than any channel used by the feedback node for providing feedback information from the communication device to the application server is unaccessible;
upon determining by the communication device that the capacity of a channel other than any channel used by the feedback node for providing feedback information from the communication device to the application server has fallen below a certain threshold value;
upon predicting by the communication device that the capacity of a channel other than any channel used by the feedback node for providing feedback information from the communication device to the application server is about to fall below a certain threshold value;
at a specified time interval; and
upon receiving a request for specific feedback information from the application server.

17. The method according to claim 11, wherein the first set of instructions comprise instructions to provide feedback information according to at least one of:
at a specific time interval, and
upon receiving a request for specific feedback information from the application server.

18. An application server configured to access feedback information from communication devices, the feedback information being associated with at least one service provided by the application server, the application server comprising a processor and a memory storing executable code, which when executed by the processor causes the application server to:
transmit a first set of instructions to at least one of the communication devices, said first set of instructions instructing the at least one communication device under which conditions the at least one communication device is to use a feedback node to provide the feedback information to the application server, and
receive feedback information provided from the at least one communication device via the feedback node, according to the first set of instructions.

19. The application server according to claim 18, wherein the application server is further configured to transmit the first set of instructions to the at least one communication device via the feedback node.

20. The application server according to claim 18, wherein the application server is further configured to transmit, for each of the at least one service, to the feedback node, a respective plug-in, the plug-in being configured to handle protocol conversions between the respective service and the feedback node.

21. The application server according to claim 18, wherein the application server is further configured to add, to each of the at least one service, a respective adapter layer, the adapter layer being configured to support a protocol applied by the feedback node.

22. The application server according to claim 18, wherein the application server is further configured to:
  transmit a second set of instructions to the feedback node, instructing the feedback node under which conditions to provide feedback information from the at least one of the communication devices, and
  receive feedback information provided from the feedback node, as provided to the feedback node from at least one of the communication devices, according to the second set of instructions.

23. The application server according to claim 22, wherein the application server is configured to provide at least one of the first and second sets of instructions as aggregation instructions instructing the at least one communication device and/or the feedback node under which conditions to aggregate and transmit feedback information provided from the communication devices towards the application server via the feedback node.

24. The application server according to claim 18, wherein the application server is further configured to:
  execute an action based on the received feedback information, and
  transmit, to the at least one communication device, via the feedback node, data resulting from the executed action.

25. A feedback node configured to make feedback information provided from communication devices accessible to an application server, the feedback information being associated with at least one service provided by the application server, the feedback node comprising a processor and a memory storing executable code which when executed by the processor configures the feedback node to:
  receive a second set of instructions from the application server, instructing the feedback node under which conditions to provide feedback information from at least one of the communication devices to the application server;
  receive feedback information from the at least one communication device, and
  forward the received feedback information to the application server, according the second set of instructions.

26. The feedback node according to claim 25, wherein the feedback node is further configured to receive, from the application server, for each of the at least one service, a respective plug-in, the plug-in being configured to handle protocol conversions between the respective service and the feedback node, and to activate the respective plug-in at the feedback node.

27. The feedback node according to claim 25, wherein the feedback node is further configured to aggregate feedback information provided from at least one of the communication devices towards the application server, according to instructions forming part of the second set of instructions.

28. The feedback node according to claim 25, wherein the feedback node is further configured to:
  receive a first set of instructions from the application server, said first set of instructions instructing at least one of the communication devices under which conditions the at least one communication device is to use the feedback node to provide feedback information from the at least one communication device to the application server, and
  forward the first set of instructions to the at least one communication device.

29. The feedback node according to claim 25, wherein the feedback node is configured to recognize a trigger to transmit a request for feedback information to the at least one communication device according to a periodicity indicated in the second set of instructions, transmit such a request and 4e-forward feedback information received in response to such a request, as indicated in the second set of instructions.

30. A communication device configured to make feedback information from the communication device accessible to an application server, the feedback information being associated with at least one service provided by the application server to the communication device, the communication device comprising a processor and a memory storing executable code which when executed by the processor configures the communication device to:
  receive a first set of instructions from the application server, said first set of instructions instructing the communication device under which conditions the communication device is to use a feedback node to provide feedback information from the communication device to the application server;
  acquire feedback information associated with the at least one service;
  determine, based on the first set of instructions, that the feedback information is to be provided to the application server via the feedback node, and, in response, transmit the feedback information towards the application server via the feedback node.

31. The communication device according to claim 30, wherein the communication device is further configured to transmit the feedback information after having aggregated the acquired feedback information together with additional feedback information, according to aggregation instructions provided in the first set of instructions.

32. The communication device according to claim 30, wherein the communication device is configured to acquire the feedback information upon identifying the occurrence of a trigger event indicated in the first set of instructions.

33. The communication device according to claim 31, wherein the communication device is configured to acquire the feedback information upon receiving a request for feedback information from the feedback node.

* * * * *